United States Patent
Kim et al.

(10) Patent No.: US 11,667,843 B2
(45) Date of Patent: Jun. 6, 2023

(54) LIQUID CRYSTAL ALIGNMENT AGENT COMPOSITION, METHOD OF PREPARING LIQUID CRYSTAL ALIGNMENT FILM, AND LIQUID CRYSTAL ALIGNMENT FILM, AND LIQUID CRYSTAL DISPLAY USING THE SAME

(71) Applicant: LG CHEM, LTD., Seoul (KR)

(72) Inventors: Seongku Kim, Daejeon (KR); Kichul Koo, Daejeon (KR); Hoonseo Park, Daejeon (KR); Jung Ho Jo, Daejeon (KR); Soonho Kwon, Daejeon (KR)

(73) Assignee: LG CHEM, LTD., Seoul (KR)

(*) Notice: Subject to any disclaimer, the term of this patent is extended or adjusted under 35 U.S.C. 154(b) by 303 days.

(21) Appl. No.: 17/045,823

(22) PCT Filed: Jan. 9, 2020

(86) PCT No.: PCT/KR2020/000407
§ 371 (c)(1),
(2) Date: Oct. 7, 2020

(87) PCT Pub. No.: WO2020/149574
PCT Pub. Date: Jul. 23, 2020

(65) Prior Publication Data
US 2021/0139782 A1    May 13, 2021

(30) Foreign Application Priority Data

Jan. 17, 2019    (KR) .......................... 10-2019-0006421

(51) Int. Cl.
*C09K 19/56* (2006.01)
*C08G 73/10* (2006.01)
*C09D 179/08* (2006.01)
*G02F 1/1337* (2006.01)

(52) U.S. Cl.
CPC .......... *C09K 19/56* (2013.01); *C08G 73/1042* (2013.01); *C08G 73/1078* (2013.01); *C08G 73/1085* (2013.01); *C09D 179/08* (2013.01); *G02F 1/13378* (2013.01); *G02F 1/133723* (2013.01); *B32B 2457/202* (2013.01); *C09K 2323/02* (2020.08); *C09K 2323/023* (2020.08); *C09K 2323/027* (2020.08)

(58) Field of Classification Search
CPC ........... B05D 3/0254; B32B 2457/202; C08G 73/10; C08G 73/1042; C08G 73/1078; C08G 73/1085; C08L 79/08; C09D 7/63; C09D 179/08; C09K 19/56; C09K 2323/02; C09K 2323/023; C09K 2323/027; G02F 1/133711; G02F 1/133723; G02F 1/13378; G02F 1/133788
See application file for complete search history.

(56) References Cited

U.S. PATENT DOCUMENTS

| | | | |
|---|---|---|---|
| 8,545,946 | B2 | 10/2013 | Tsai et al. |
| 9,771,519 | B2 | 9/2017 | Katano et al. |
| 10,041,000 | B2 | 8/2018 | Furusato et al. |
| 10,175,538 | B2 | 1/2019 | Furusato et al. |
| 10,435,627 | B2 | 10/2019 | Furusato et al. |
| 10,606,128 | B2 | 3/2020 | Kwon et al. |
| 2010/0243955 | A1 | 9/2010 | Tsai et al. |
| 2012/0088040 | A1 | 4/2012 | Matsumori et al. |
| 2017/0227820 | A1 | 8/2017 | Furusato et al. |
| 2017/0327743 | A1 | 11/2017 | Katano et al. |
| 2018/0231845 | A1 | 8/2018 | Kwon et al. |
| 2018/0298284 | A1* | 10/2018 | Jo ..................... G02F 1/133723 |
| 2019/0106628 | A1 | 4/2019 | Yun et al. |
| 2019/0292138 | A1 | 9/2019 | Yun et al. |
| 2019/0390116 | A1 | 12/2019 | Jo et al. |
| 2020/0002478 | A1 | 1/2020 | Kwon et al. |
| 2020/0002614 | A1 | 1/2020 | Lee et al. |
| 2021/0061976 | A1 | 3/2021 | Koo et al. |

FOREIGN PATENT DOCUMENTS

| | | | | |
|---|---|---|---|---|
| CN | 104046369 | A | | 9/2014 |
| CN | 104059227 | A | | 9/2014 |
| CN | 107849247 | A | | 3/2018 |
| CN | 109073935 | A | | 12/2018 |
| CN | 110144043 | A | * | 8/2019 ............. C08G 73/14 |
| CN | 111601843 | A | | 8/2020 |
| EP | 0927992 | A1 | | 7/1999 |
| JP | 2010-250307 | A | | 11/2010 |

(Continued)

OTHER PUBLICATIONS

Yi et al., "Polyimides with Side Groups: Synthesis and Effects of Side Groups on Their Properties", Journal of Polymer Science, Polymer Chemistry, 2017, vol. 55, pp. 533-559.

(Continued)

*Primary Examiner* — Eli D. Strah
(74) *Attorney, Agent, or Firm* — Rothwell, Figg, Ernest & Manbeck, P.C.

(57) ABSTRACT

The present invention relates to a liquid crystal alignment agent composition including a copolymer for liquid crystal alignment agent containing two types of repeating units classified according to the types of diamine-derived functional groups, and a crosslinker compound in which the protecting group having a specific structure was introduced, a method for preparing a liquid crystal alignment film using the same, and a liquid crystal alignment film and a liquid crystal display device using the same.

18 Claims, No Drawings

(56) References Cited

FOREIGN PATENT DOCUMENTS

| | | |
|---|---|---|
| JP | 2013-185032 A | 9/2013 |
| JP | 2015-020999 A | 2/2015 |
| JP | 2015-212807 A | 11/2015 |
| JP | 2017-102350 A | 6/2017 |
| JP | 2017-198975 A | 11/2017 |
| KR | 10-2009-0119286 A | 11/2009 |
| KR | 10-2010-0059693 A | 6/2010 |
| KR | 10-2010-0062923 A | 6/2010 |
| KR | 10-2011-0088394 A | 8/2011 |
| KR | 10-2015-0118527 A | 10/2015 |
| KR | 10-2015-0138022 A | 12/2015 |
| KR | 10-2015-0139426 A | 12/2015 |
| KR | 10-2016-0095801 A | 8/2016 |
| KR | 10-2017-0002391 A | 1/2017 |
| KR | 10-2017-0040087 A | 4/2017 |
| KR | 10-2017-0063677 A | 6/2017 |
| KR | 10-2017-0127966 A | 11/2017 |
| KR | 10-1823712 B1 | 1/2018 |
| KR | 10-2018-0020722 A | 2/2018 |
| KR | 10-2018-0023368 A | 3/2018 |
| KR | 10-2018-0065776 A | 6/2018 |
| KR | 10-2019-0002204 A | 1/2019 |
| KR | 10-2019-0003234 A | 1/2019 |
| KR | 10-2019-0087819 A | 7/2019 |
| TW | 201209078 A | 3/2012 |
| TW | 201538573 A | 10/2015 |
| TW | 201627484 A | 8/2016 |
| TW | 201843297 A | 12/2018 |
| WO | 99-04390 A1 | 1/1999 |
| WO | 2011-149071 A1 | 12/2011 |
| WO | 2014-069550 A1 | 5/2014 |
| WO | 2015-146330 A1 | 10/2015 |
| WO | 2015-159656 A1 | 10/2015 |
| WO | 2016-002252 A1 | 1/2016 |
| WO | 2016-021333 A1 | 2/2016 |
| WO | 2016-047774 A1 | 3/2016 |
| WO | WO-2017196001 A1 * | 11/2017 ............. C09K 19/52 |
| WO | WO-2018034409 A1 * | 2/2018 ........... C09D 177/06 |
| WO | WO-2018038436 A1 * | 3/2018 ........... C07C 231/02 |
| WO | 2018-216940 A1 | 11/2018 |

OTHER PUBLICATIONS

Tamai et al., "Melt processable polyimides and their chemical structures", Polymer, 1996, vol. 37, No. 16, pp. 3683-3692.

International Search Report issued for PCT Application No. PCT/KR2020/000407 dated May 28, 2020, 2 pages.

* cited by examiner

LIQUID CRYSTAL ALIGNMENT AGENT COMPOSITION, METHOD OF PREPARING LIQUID CRYSTAL ALIGNMENT FILM, AND LIQUID CRYSTAL ALIGNMENT FILM, AND LIQUID CRYSTAL DISPLAY USING THE SAME

CROSS-REFERENCE TO RELATED APPLICATION(S)

This application is a 35 U.S.C. 371 National Phase Entry Application from PCT/KR2020/000407, filed on Jan. 9, 2020, designating the United States, which claims the benefit of filing dates of Korean Patent Application No. 10-2019-0006421 filed with Korean Intellectual Property Office on Jan. 17, 2019, the entire contents of which are incorporated herein by reference.

TECHNICAL FIELD

The present invention relates to a liquid crystal alignment agent composition having excellent liquid crystal alignment property, durability and electrical characteristics while having excellent film strength, and also having excellent shielding power through high film density, a method for preparing a liquid crystal alignment film using the same, and a liquid crystal alignment film and a liquid crystal display device using the same.

BACKGROUND OF THE INVENTION

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In general, in order to obtain uniform luminance and a high contrast ratio in a liquid crystal display device, it is essential to uniformly align liquid crystals.

As one of the conventional methods of aligning liquid crystals, a rubbing method of coating a polymer film such as polyimide onto a substrate such as glass or the like and rubbing a surface thereof using fibers such as nylon or polyester in a predetermined direction has been used. However, the rubbing method may cause serious problems during manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than the rubbing, and aligning liquid crystals using anisotropy has been studied recently.

As materials that can be used for the photo-alignment method, various materials have been introduced, among which polyimide is mainly used for various superior performance of a liquid crystal alignment film. Thus, after coating in the form of a precursor such as a polyamic acid or a polyamic acid ester, a heat treatment process is performed at a temperature of 200° C. to 230° C. of to form polyimide, which is then subjected to light irradiation to perform alignment treatment.

However, as a large amount of energy is required for obtaining sufficient liquid crystal alignment properties by subjecting the films of polyimide to light irradiation, it is difficult to secure substantial productivity, and additionally, an additional heat treatment process is required for securing alignment stability after the light irradiation. Due to a larger size of a panel, a column space (CS)-sweeping phenomenon occurs in the manufacturing process, and haze is generated on the surface of the liquid crystal alignment film, which causes a galaxy problem. Thus, there was a limitation in that the performance of the panel is not sufficiently realized.

In addition, a high voltage holding ratio (VHR) should be exhibited for high-quality driving of the liquid crystal display device, but it is difficult to exhibit the same by using only polyimide. In particular, recently, as the demand for low-power displays has increased, it has been discovered that liquid crystal alignment agents can affect not only the fundamental properties of the alignment of liquid crystal but also electrical characteristics such as afterimage or voltage holding ratio caused by a DC/AC voltage.

Thus, in order to produce a liquid crystal alignment film having a high film strength required in the field of display, a method of adding various crosslinkers to the liquid crystal alignment agent composition has been proposed. However, the simple addition of the crosslinker compound decreases the electrical characteristics at high temperatures and low frequencies, making it difficult to produce a liquid crystal alignment film applicable to a high performance/low power display.

Accordingly, there is a demand for the development of a composition capable of enhancing the alignment and electrical characteristics of the alignment film even while producing an alignment film having a high film strength.

BRIEF SUMMARY OF THE INVENTION

The present invention provides a liquid crystal alignment agent composition having excellent liquid crystal alignment property, durability and electrical characteristics while having excellent film strength, and also having excellent shielding power through high film density.

The present invention also provides a method for preparing a liquid crystal alignment film using the aforementioned liquid crystal alignment agent composition.

The present invention further provides a liquid crystal alignment film using the aforementioned liquid crystal alignment agent composition, and a liquid crystal display device including the same.

In one aspect of the present invention, there is provided a liquid crystal alignment agent composition including: a copolymer for liquid crystal alignment agent containing a first repeating unit including at least one selected from the group consisting of a repeating unit represented by the following Chemical Formula 1, a repeating unit represented by the following Chemical Formula 2, and a repeating unit represented by the following Chemical Formula 3, and a second repeating unit including at least one selected from the group consisting of a repeating unit represented by the following Chemical Formula 4, a repeating unit represented by the following Chemical Formula 5 and a repeating unit represented by the following Chemical Formula 6; and a crosslinker compound represented by the following Chemical Formula 11.

[Chemical Formula 1]

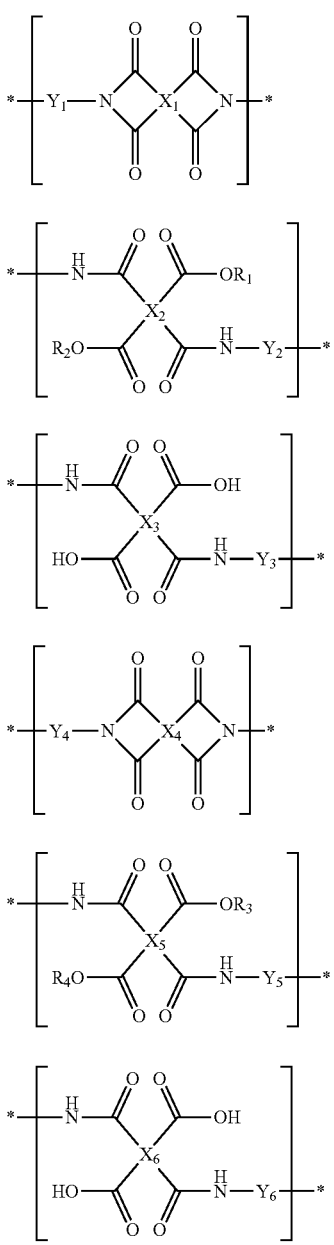

[Chemical Formula 2]

[Chemical Formula 3]

[Chemical Formula 4]

[Chemical Formula 5]

[Chemical Formula 6]

in Chemical Formulas 1 to 6, at least one of $R_1$ and $R_2$ is an alkyl group having 1 to 10 carbon atoms and the rest is hydrogen, at least one of $R_3$ and $R_4$ is an alkyl group having 1 to 10 carbon atoms and the rest is hydrogen, and $X_1$ to $X_6$ are each independently a tetravalent organic group represented by the following Chemical Formula 7,

[Chemical Formula 7]

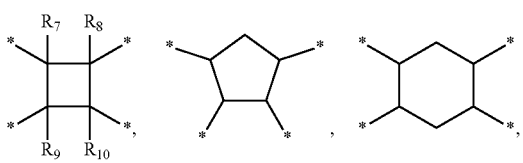

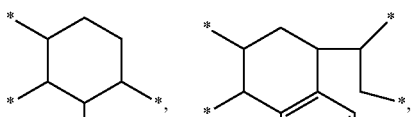

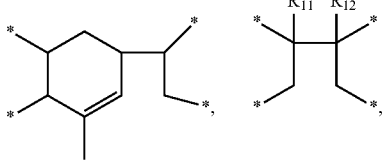

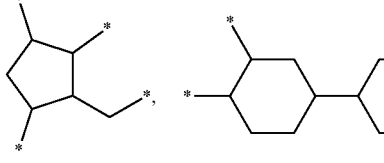

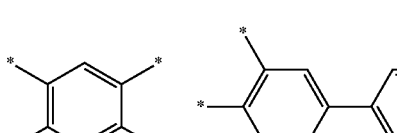

in Chemical Formula 7, $R_7$ to $R_{12}$ are each independently hydrogen or an alkyl group having 1 to 6 carbon atoms, $L_1$ is any one selected from a single bond, —O—, —CO—, —COO—, —S—, —SO—, —SO$_2$—, —CR$_{13}$R$_{14}$—, —(CH$_2$)$_Z$—, —O(CH$_2$)$_Z$O—, —COO(CH$_2$)$_Z$OCO—, —CONH—, or phenylene, $R_{13}$ and $R_{14}$ in the $L_1$ are each independently hydrogen, an alkyl group having 1 to 10 carbon atoms or a haloalkyl group having 1 to 10 carbon atoms, Z in the $L_1$ is an integer of 1 to 10, the $Y_1$ to $Y_3$ are each independently a divalent organic group represented by the following Chemical Formula 8,

[Chemical Formula 8]

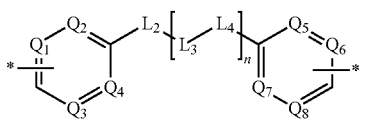

in Chemical Formula 8, at least one of $Q_1$ to $Q_8$ is nitrogen and the rest is carbon, at least one of $L_2$ and $L_4$ is one of —CON(R$_{15}$)—, —N(R$_{16}$)CO— and the rest is a direct bond, $L_3$ is a direct bond or a divalent functional group, $R_{15}$ to $R_{16}$ are each independently an alkyl group having 1 to 20 carbon atoms or hydrogen, n is an integer of 1 or more, the $Y_4$ to $Y_6$ are each independently a divalent organic group different from the divalent organic group represented by Chemical Formula 8,

[Chemical Formula 11]

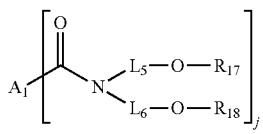

in Chemical Formula 11, $A_1$ is a monovalent to tetravalent functional group, j is an integer of 1 to 4, $L_5$ and $L_6$ are equal to or different from each other, and each independently, an alkylene group having 1 to 10 carbon atoms or an arylene group having 6 to 20 carbon atoms, and $R_{17}$ and $R_{18}$ are each independently a silicon-containing monovalent functional group.

In another aspect of the present invention, there is provided a method for preparing a liquid crystal alignment film including the steps of: coating the liquid crystal alignment agent composition onto a substrate to form a coating film; drying the coating film; irradiating the coating film with light or subjecting to the coating film to rubbing treatment to perform alignment treatment; and heat-treating and curing the alignment-treated coating film.

In a further aspect of the present invention, there is provided a liquid crystal alignment film including an aligned cured product of the aforementioned liquid crystal alignment agent composition, and a liquid crystal display device including the same.

DETAILED DESCRIPTION OF THE INVENTION

Hereinafter, a liquid crystal alignment agent composition according to specific embodiments of the present invention, a method for preparing a liquid crystal alignment film using the same, and a liquid crystal alignment film and a liquid crystal display device using the same will be described in more detail.

Throughout the specification, when one part "includes" one constituent element, unless otherwise specifically described, this does not mean that another constituent element is excluded, but means that another constituent element may be further included.

As used herein, the term "substituted" means that a hydrogen atom bonded to a carbon atom in a compound is replaced with another functional group, and a position to be substituted is not limited as long as the position is a position at which the hydrogen atom is substituted, that is, a position at which the substituent can be substituted, and when two or more are substituted, the two or more substituents may be equal to or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

In the present specification, the notation

or ⎯⎯⎯* means a bond linked to another substituent group,

In the present specification, the alkyl group may be straight-chained or branched, and the number of carbon atoms thereof is not particularly limited, but is preferably 1 to 10. According to another exemplary embodiment, the number of carbon atoms of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 4-methylhexyl, 5-methylhexyl, and the like, but are not limited thereto. the alkyl group may be substituted or unsubstituted.

In the present specification, the haloalkyl group means a functional group in which a halogen group is substituted with the aforementioned alkyl group, and examples of the halogen group include fluorine, chlorine, bromine or iodine. The haloalkyl group may be substituted or unsubstituted.

In the present specification, an aryl group is a monovalent functional group derived from arene, and may be, for example, monocyclic or polycyclic. Specific examples of the monocyclic aryl group may include a phenyl group, a biphenyl group, a terphenyl group, a stilbenyl group, and the like, but are not limited thereto. Specific examples of the polycyclic aryl group may include a naphthyl group, an anthryl group, a phenanthryl group, a pyrenyl group, a perylenyl group, a chrysenyl group, a fluorenyl group, and the like, but are not limited thereto. The aryl group may be substituted or unsubstituted.

A halogen may be fluorine (F), chlorine (Cl), bromine (Br), or iodine (I).

In the present specification, the alkylene group is a bivalent group derived from alkane, and the number of carbon atoms thereof is 1 to 20, or 1 to 10, or 1 to 5. Examples thereof may be straight-chained, branched or cyclic methylene group, ethylene group, propylene group, isobutylene group, sec-butylene group, tert-butylene group, pentylene group, hexylene group, and the like. One or more hydrogen atoms contained in the alkylene group can each be substituted with a substituent as in the case of the aforementioned alkyl group.

In the present specification, the heteroalkylene group is an alkylene group containing oxygen (O), nitrogen (N) or S as a heteroatom, and the number of carbon atoms thereof is 1 to 10, or 1 to 5. Examples thereof may be oxyalkylene and the like. The one or more hydrogen atoms contained in the heteroalkylene group can be substituted with a substituent as in the case of the aforementioned alkyl group.

In the present specification, the cycloalkylene group is a divalent group derived from a cycloalkane, and the number of carbon atoms thereof is 3 to 30, or 3 to 20, or 3 to 10. Examples thereof include cyclopropylene, cyclobutylene, cyclopentylene, 3-methylcyclopentylene, 2,3-dimethylcyclopentylene, cyclohexylene, 3-methylcyclohexylene, 4-methylcyclohexylene, 2,3-dimethylcyclohexylene, 3,4,5-trimethylcyclohexylene, 4-tert-butylcyclohexylene, cycloheptylene, cyclooctylene, and the like, but are not limited thereto.

In the present specification, the arylene group means a divalent functional group derived from an arene, and may be, for example, monocyclic or polycyclic, and the number of carbon atoms thereof is 6 to 20, or 6 to 10. Examples thereof include a phenylene group, a biphenylene group, a terphenylene group, a stilbenylene group, a naphthylenyl group, and the like, but are not limited thereto. One or more hydrogen atoms contained in the arylene group can be substituted with a substituent as in the case of the aforementioned alkyl group.

In the present specification, the heteroarylene group has 2 to 20, or 2 to 10, or 6 to 20 carbon atoms. The heteroarylene group is an arylene group containing O, N or S as a heteroatom, and one or more hydrogen atoms contained in the heteroarylene group may be substituted with a substituent as in the case of the aforementioned alkyl group.

In the present specification, the copolymer refers to a composite polymer containing two or more types of repeating units.

In the present specification, the copolymer is intended to include all of a random copolymer, a block copolymer, a graft copolymer and the like.

As used herein, the weight average molecular weight refers to a weight average molecular weight in terms of polystyrene measured by GPC method. In the process of measuring the weight average molecular weight in terms of polystyrene measured by GPC method, a detector and an analytical column, such as a commonly known analysis apparatus and differential refractive index detector can be used, and commonly applied temperature conditions, solvent, and flow rate can be used. Specific examples of the measurement conditions are as follows: Polymer Laboratories PLgel MIX-B, 300 mm column, Waters PL-GPC220 instrument is used, the evaluation temperature is 40° C., dimethylformamide (DMF) and tetrahydrofuran (THF) are mixed at a weight ratio of 50 wt %:50 wt % and used as a solvent, the flow rate is 1 mL/min, a sample is prepared at a concentration of 10 mg/10 mL and then fed in an amount of 200 μL, and the value of Mw can be determined using calibration curves formed from a polystyrene standard. The molecular weight of the polystyrene standards is five kinds of 1,000/5.000/10,000/30,000/100.000.

In the present specification, a multivalent functional group is a residue in which a plurality of hydrogen atoms bonded to an arbitrary compound are removed, and for example, it may be a divalent functional group, a trivalent functional group, and a tetravalent functional group. As an example, a tetravalent functional group derived from cyclobutane means a residue in which any four hydrogen atoms bonded to cyclobutane are removed.

In the present specification, a direct bond or a single bond means being connected to a bond line where no atoms or atomic groups exist at the corresponding position. Specifically, it means the case where no other atoms exist in the parts represented as $L_1$, $L_2$ in the chemical formula.

A major characteristic of the liquid crystal alignment agent composition according to the present invention is that it includes a copolymer for a liquid crystal alignment agent containing the repeating unit derived from the diamine of a specific structure containing an amide bond, and the like.

The present inventors found through experiments that since the liquid crystal alignment agent composition includes a copolymer for a liquid crystal alignment agent including a repeating unit derived from a diamine of a specific structure containing an amide bond or the like, it is excellent in liquid crystal alignment property, and can have a high voltage holding ratio even at high temperature and low frequency, can improve a reduction in contrast ratio and an afterimage phenomenon, suppresses charge accumulation due to voltage asymmetry during AC driving, discharges the accumulated charge quickly to improve the electrical performance, and as the film density increases, the shielding power improves. The present invention has been completed on the basis of such findings.

Specifically, the copolymer for a liquid crystal alignment agent including a repeating unit derived from a diamine having a specific structure containing an amide bond or the like has a chemical structural feature in which two aromatic ring compounds link via a functional group containing an amide bond, and therefore, since a hydrogen bond between repeating units is formed, it is possible to implement excellent shielding power as the film density is improved.

In addition, it has been found through experiments that the liquid crystal alignment agent composition of the one embodiment, when the crosslinker compound added together with the copolymer for liquid crystal alignment agent is configured so that the terminal of the hydroxyl group (—OH) which is a crosslinkable functional group is replaced with specific functional groups of $R_{17}$ and $R_{18}$, as shown in Chemical Formula 11, not only the liquid crystal alignment film produced from the liquid crystal alignment agent composition has improved the alignment stability and alignment properties, but also realizes excellent dispersibility, thereby completing the present invention.

Moreover, the present inventors have found that when the terminal of the hydroxyl group (—OH) which is the crosslinkable functional group is substituted with silicon-containing functional groups of $R_{17}$ and $R_{18}$, by including the silicon-containing functional groups, the reactivity of the crosslinker in the initial drying step is lower than that of the existing hydroxy group (—OH) terminal crosslinker, the crosslinking reaction starts after the exposure step for alignment, and thereby, the decrease in the initial alignment by the crosslinker is reduced.

Further, it has been found through experiments that during the process of imidization after exposure for alignment, the technical effect of increasing the rearrangement rate while increasing the imidization conversion rate and thus increasing the alignment property is obtained, thereby completing the present invention.

The functional groups of $R_{17}$ and $R_{18}$ introduced at the terminal of the crosslinkable functional group of the crosslinker compound can suppress the crosslinking reaction by the crosslinkable functional group in the liquid crystal alignment agent composition, and thus, minimize unnecessary crosslinking structure formation to improve stability and reliability of the composition; the functional groups are desorbed and removed at a temperature of about 80° C. or higher by the heat treatment during drying or firing of the liquid crystal alignment film, and simultaneously the hydroxyl group at the terminal of the crosslinkable functional group is recovered, and thus, a smooth crosslinking reaction can proceed to improve the mechanical properties of the alignment film.

That is, in the liquid crystal alignment agent composition, the structure of the crosslinker compound represented by Chemical Formula 11 is maintained, and the crosslinking reaction between the polyimide or its precursor polymer and the crosslinker compound represented by Chemical Formula 11 may be suppressed. Then, through a drying step, an exposure step, a curing step, etc. for producing a liquid crystal aligning film from a liquid crystal alignment agent composition, the functional groups of $R_{17}$ and $R_{18}$ are substituted with hydrogen atoms in the crosslinker compound represented by Chemical Formula 11 when increasing the temperature by heat treatment, and a crosslinking reaction between the polyimide or its precursor polymer and the crosslinker compound represented by Chemical Formula 13 described below may proceed.

Therefore, the liquid crystal alignment agent composition of the embodiment can suppress the crosslinking reactivity of the crosslinker compound added in the composition and sufficiently improve the dispersibility of the crosslinker compound and the polyimide or its precursor polymer. Through a crosslinking reaction between the crosslinker compound and the polyimide or its precursor polymer within the composition during the production process of the liquid crystal alignment film according to another embodiment described later, the strength of the alignment layer is improved, and excellent alignment and electrical characteristics can be realized in the finally prepared liquid crystal alignment cell.

I. Liquid Crystal Alignment Agent Composition

According to one embodiment of the invention, there can be provided a liquid crystal alignment agent composition including: a copolymer for liquid crystal alignment agent containing a first repeating unit including at least one selected from the group consisting of a repeating unit represented by Chemical Formula 1, a repeating unit represented by Chemical Formula 2, and a repeating unit represented by Chemical Formula 3, and a second repeating unit including at least one selected from the group consisting of a repeating unit represented by Chemical Formula 4, a repeating unit represented by Chemical Formula 5 and a repeating unit represented by Chemical Formula 6; and a crosslinker compound represented by Chemical Formula 11.

Specifically, the first repeating unit may include one of a repeating unit represented by Chemical Formula 1, a repeating unit represented by Chemical Formula 2, and a repeating unit represented by Chemical Formula 3, a mixture of two of them, or a mixture of all three of them.

Further, the second repeating unit may include one of a repeating unit represented by Chemical Formula 4, a repeating unit represented by Chemical Formula 5 and a repeating unit represented by Chemical Formula 6, a mixture of two of them, or a mixture of all three of them.

Specifically, in the first repeating unit and the second repeating unit included in the liquid crystal alignment agent composition according to the embodiment, $X_1$ to $X_6$ may be each independently a tetravalent organic group represented by Chemical Formula 7. That is, the $X_1$ to $X_3$ may be a functional group derived from tetracarboxylic anhydride in a first repeating unit including a combination of a diamine containing a heteroaromatic ring and a tetracarboxylic anhydride, the $X_4$ to $X_6$ may be a functional group derived from tetracarboxylic anhydride in a second repeating unit including a combination of a diamine containing two or more aromatic rings and a tetracarboxylic anhydride. More specifically, the $X_1$ to $X_6$ may be a functional group derived from a tetracarboxylic acid anhydride compound used in the synthesis of polyamic acid, polyamic acid ester, or polyimide.

In Chemical Formula 7, $R_7$ to $R_{12}$ are each independently hydrogen or an alkyl group having 1 to 6 carbon atoms, $L_1$ is any one selected from a single bond, —O—, —CO—, —COO—, —S—, —SO—, —SO$_2$—, —CR$_{13}$R$_{14}$—, —(CH$_2$)$_Z$—, —O(CH$_2$)$_Z$O—, —COO(CH$_2$)$_Z$OCO—, —CONH—, or phenylene, $R_{13}$ and $R_{14}$ in the $L_1$ are each independently hydrogen, an alkyl group having 1 to 10 carbon atoms or a haloalkyl group having 1 to 10 carbon atoms, and Z in the $L_1$ is an integer of 1 to 10.

More preferably, $X_1$ to $X_6$ may be each independently an organic group of the following Chemical Formula 7-1 derived from cyclobutane-1,2,3,4-tetracarboxylic dianhydride, an organic group of the following Chemical Formula 7-2 derived from 1,3-dimethylcyclobutane-1,2,3,4-tetracarboxylic dianhydride, an organic group of the following Chemical Formula 7-3 derived from tetrahydro-[3,3'-bifuran]-2,2',5,5'-tetraone, an organic group represented by the following Chemical Formula 7-4 derived from 1,2,4,5-cyclohexanetetracarboxylic acid dianhydride, an organic group of the following Chemical Formula 7-5 derived from pyromellitic acid dianhydride, or an organic group represented by the following Chemical Formula 7-6 derived from 3,3',4,4'-biphenyltetracarboxylic acid dianhydride.

[Chemical Formula 7-1]

[Chemical Formula 7-2]

[Chemical Formula 7-3]

[Chemical Formula 7-4]

[Chemical Formula 7-5]

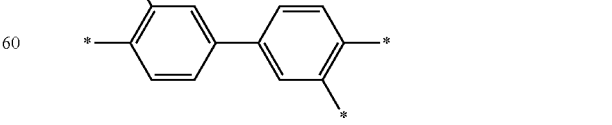

[Chemical Formula 7-6]

Meanwhile, in the liquid crystal alignment agent composition according to the embodiment, the first repeating unit included in the polymer for a liquid crystal alignment agent may be a divalent organic group in which Y to $Y_3$ are each independently represented by Chemical Formula 8 in the repeating units of Chemical Formulas 1 to 3.

That is, the first repeating unit may include a combination of a diamine containing heteroaromatic ring and a tetracarboxylic dianhydride, the $Y_1$ to $Y_3$ may be a functional group derived from a diamine containing a heteroaromatic ring in a first repeating unit including a combination of a diamine containing a heteroaromatic ring and a tetracarboxylic anhydride.

The diamine containing the hetero aromatic ring means the diamine containing a heteroarylene group. The hetero arylene group means an arylene group containing O, N or S as a hetero atom.

Specifically, the diamine containing the heteroaromatic ring may be a diamine including an arylene group containing N as a hetero atom. More specifically, the diamine containing the hetero aromatic ring may include an arylene group derived from pyridine.

The diamine containing the heteroaromatic ring is not particularly limited, but may be, for example, a diamine represented by the following Chemical Formula 8'.

[Chemical Formula 8']

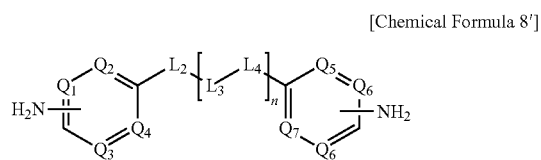

in Chemical Formula 8', at least one of $Q_1$ to $Q_8$ is nitrogen and the rest is carbon, at least one of $L_2$ and $L_4$ is one of —$CON(R_{15})$—, —$N(R_{16})CO$— and the rest is a direct bond, $L_3$ is a direct bond or a divalent functional group, $R_{15}$ to $R_{16}$ are each independently an alkyl group having 1 to 20 carbon atoms or hydrogen, and n is an integer of 1 or more.

Specifically, the diamine represented by Chemical Formula 8' may be a diamine represented by Chemical Formula 8'-1 to Chemical Formula 8'-2.

[Chemical Formula 8'-1]

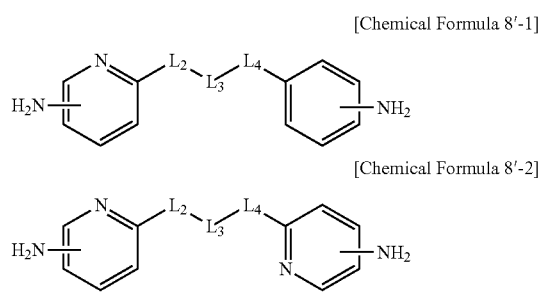

[Chemical Formula 8'-2]

in Chemical Formula 8'-1 to Chemical Formula 8'-2, at least one of $L_2$ and $L_4$ is one of —$CON(R_{15})$— and —$N(R_{16})CO$— and the rest is a direct bond, $L_3$ is a direct bond or a divalent functional group, $R_{15}$ to $R_{16}$ are each independently an alkyl group having 1 to 20 carbon atoms or hydrogen, and n may be an integer of 1 or more.

More specifically, the diamine represented by Chemical Formula 8' may be a diamine represented by the Chemical Formula 8'-a to Chemical Formula 8'-c.

[Chemical Formula 8'-a]

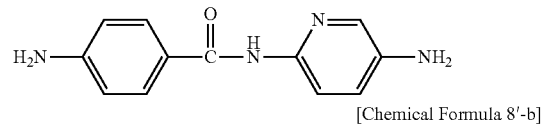

[Chemical Formula 8'-b]

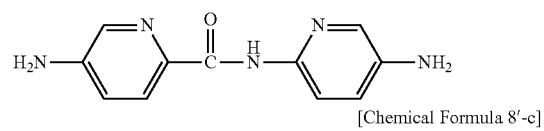

[Chemical Formula 8'-c]

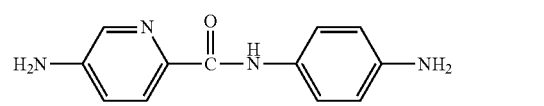

The tetracarboxylic dianhydride may be represented by the following Chemical Formula 7'.

[Chemical Formula 7']

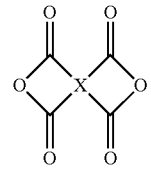

in Chemical Formula 7', X may be a tetravalent functional group represented by Chemical Formula 7.

The kind of the tetracarboxylic dianhydride is not particularly limited, but may be, for example, 1,3-dimethylcyclobutane-1,2,3,4-tetracarboxylic dianhydride represented by the following Chemical Formula 7'-1 or pyromellitic acid anhydride represented by the following Chemical Formula 7'-2.

[Chemical Formula 7'-1]

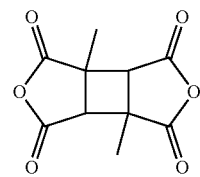

[Chemical Formula 7'-2]

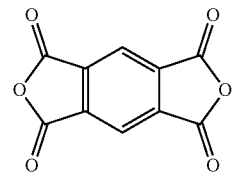

The combination of the diamine containing hetero aromatic ring and the tetracarboxylic dianhydride may mean a compound in which a nitrogen atom of the amino group included in the diamine containing hetero aromatic ring, and a carbon atom of the carbonyl group included in the tetracarboxylic dianhydride are linked.

Due to the inclusion of the first repeating unit containing an organic group represented by Chemical Formula 8, even while satisfying the same or a higher level of alignment and after-image characteristics as a liquid crystal alignment agent, the voltage holding ratio is greatly improved, and so excellent electrical characteristics such as a high DC charging speed and a low content of residual DC can be realized.

In Chemical Formula 8, when the functional group that mediates the bond between two aromatic ring compounds includes an amide functional group, the liquid crystal alignment agent composition according to one embodiment contains a copolymer for a liquid crystal alignment agent containing the first repeating unit. Thus, the amide functional group is maintained without being decomposed or deformed even by high temperature heat treatment during the coating, drying, alignment, and firing steps of the liquid crystal alignment agent composition, and the effects related to the aforementioned electrical characteristics can be stably realized in the alignment film and the alignment cell.

Further, as the functional group represented by Chemical Formula 8 has a chemical structural feature that the two aromatic ring compounds are linked via a functional group including an amide bond, a hydrogen bond is formed between repeating units and the film density is improved, thereby realizing excellent shielding power.

Specifically, in Chemical Formula 8, $L_3$ is one of a direct bond, —O—, —S—, —N($R_{21}$)—, —COO—, —CO($R_{22}$)—, —$R_{23}$O—, —C(CF$_3$)$_2$—, —O($R_{24}$)—, an alkylene group having 1 to 20 carbon atoms, a haloalkylene group having 1 to 20 carbon atoms, a cycloalkylene group having 1 to 20 carbon atoms, and an arylene group having 1 to 30 carbon atoms, $R_{21}$ is an alkyl group having 1 to 20 carbon atoms or hydrogen, $R_{22}$ to $R_{24}$ may be each independently one of a direct bond, an alkylene group having 1 to 20 carbon atoms, and a haloalkylene group having 1 to 20 carbon atoms.

More specifically, in the organic group represented by Chemical Formula 8, at least one of $Q_1$ to $Q_4$ may be nitrogen and the rest may be carbon. More preferably, in Chemical Formula 8, at least one of $Q_2$ and $Q_4$ may be nitrogen, the rest may be carbon and $Q_1$ and $Q_3$ may be carbon.

Further, in the organic group represented by Chemical Formula 8, at least one of $Q_5$ to $Q_8$ may be nitrogen, and the rest may be carbon. More preferably, in Chemical Formula 8, at least one of $Q_5$ and $Q_7$ may be nitrogen, the rest may be carbon, and $Q_6$ and $Q_8$ may be carbon.

As such, in the functional group represented by Chemical Formula 8, when at least one, or both, of the two aromatic ring compounds that bond via the functional group including an amide bond, are heteroaromatic ring compounds, the effects of improving the liquid crystal alignment properties or electrical characteristics are maximized, and simultaneously a sufficient level of high imidization rate may be secured (e.g., via a heat treatment at 230° C.) when the imidation reaction is performed on the polyamic acid or polyamic acid ester formed by the reaction of amine and acid anhydride.

Meanwhile, in Chemical Formula 8, $L_2$ is —N($R_{16}$)CO—, $L_4$ is —CON($R_{15}$)— or a direct bond, $L_3$ is one of a direct bond, an alkylene group having 1 to 20 carbon atoms, a haloalkylene group having 1 to 20 carbon atoms, a cycloalkylene group having 1 to 20 carbon atoms, and an arylene group having 1 to 30 carbon atoms, $R_{15}$ to $R_{16}$ are each independently an alkyl group having 1 to 20 carbon atoms or hydrogen, and n may be 1.

Specifically, Chemical Formula 8 may include one of the functional groups represented by the following Chemical Formula 8-1 to Chemical Formula 8-2.

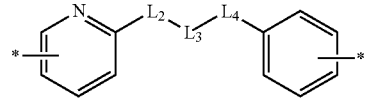

[Chemical Formula 8-1]

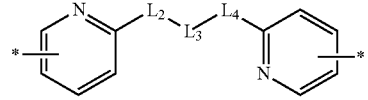

[Chemical Formula 8-2]

in Chemical Formula 8-1 to Chemical Formula 8-2, at least one of $L_2$ and $L_4$ is one of —CON($R_{15}$)— and —N($R_{16}$)CO—, the rest is a direct bond, $L_3$ is a direct bond or a divalent functional group, $R_1$ to $R_{16}$ are each independently an alkyl group having 1 to 20 carbon atoms or hydrogen, and n may be an integer of 1 or more.

More specifically, Chemical Formula 8 includes functional groups represented by the following Chemical Formula 8-a to Chemical Formula 8-c.

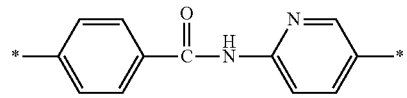

[Chemical Formula 8-a]

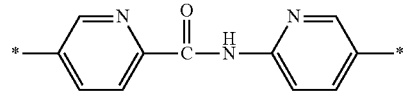

[Chemical Formula 8-b]

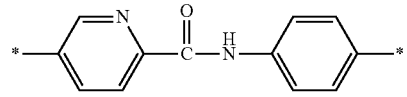

[Chemical Formula 8-c]

Meanwhile, the second repeating unit contained in the polymer for a liquid crystal alignment agent in the liquid crystal alignment agent composition according to the embodiment may include an aromatic divalent organic group in which in a repeating unit represented by Chemical Formulas 4 to 6, $Y_4$ to $Y_6$ include each independently an arylene group having 6 to 30 carbon atoms; or an imide-based aromatic divalent organic group containing an arylene group having 6 to 30 carbon atoms and an imide group.

That is, the second repeating unit may include a combination of a diamine containing an arylene group having 6 to 30 carbon atoms, and a tetracarboxylic dianhydride, or a combination of a diamine containing an imide-based aromatic divalent organic group containing an imide group, and a tetracarboxylic dianhydride.

The diamine containing the arylene group having 6 to 30 carbon atoms means a diamine containing an arylene group. Specifically, the arylene group may mean an aromatic divalent functional group that does not include heteroatoms such as 0, S, and N.

The diamine including the arylene group having 6 to 30 carbon atoms is not particularly limited, but may be, for example, a diamine represented by the following Chemical Formula 10'.

[Chemical Formula 10']

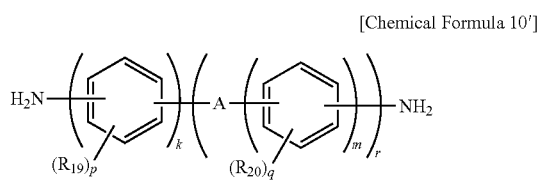

In Chemical Formula 10', $R_{19}$ and $R_{20}$ are each independently hydrogen, halogen, cyano, nitrile, an alkyl having 1 to 10 carbon atoms, an alkenyl having 2 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, A is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer from 1 to 10, k and m are each independently an integer of 0 to 3, and r is an integer of 0 to 3.

Examples of the diamine represented by Chemical Formula 10' are not particularly limited, but may be, for example, diamines represented by the following Chemical Formula 10'- or Chemical Formula 10'-2.

[Chemical Formula 10'-1]

[Chemical Formula 10'-2]

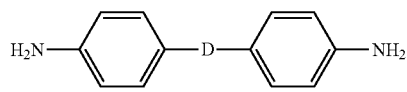

in Chemical Formula 10'-2, D is CH$_2$.

The tetracarboxylic dianhydride may be represented by the following Chemical Formula 7'.

[Chemical Formula 7']

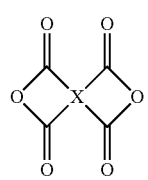

in Chemical Formula 7', X may be a tetravalent functional group represented by Chemical Formula 7.

The type of the tetracarboxylic dianhydride is not particularly limited, but for example, it may be 1,3-dimethyl-cyclobutane-1,2,3,4-tetracarboxylic dianhydride represented by the following Chemical Formula 7'-1 or pyromellitic dianhydride represented by the following Chemical Formula 7'-2.

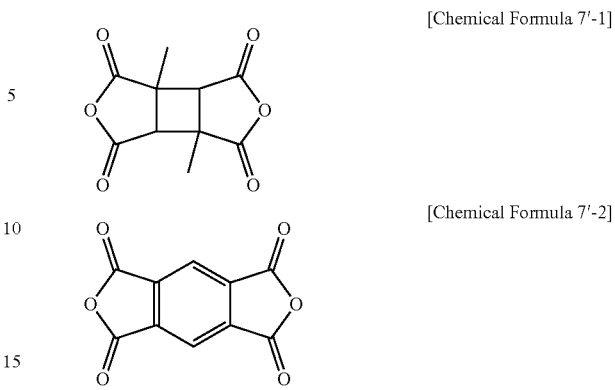

[Chemical Formula 7'-1]

[Chemical Formula 7'-2]

The combination of the diamine containing an aromatic ring and the tetracarboxylic dianhydride may mean a compound in which a nitrogen atom of the amino group contained in the diamine containing the hetero aromatic ring, and a carbon atom of the carbonyl group contained in the tetracarboxylic dianhydride are linked.

That is, the $Y_4$ to $Y_6$ may be an aromatic divalent organic group including an arylene group having 6 to 30 carbon atoms.

More specifically, the $Y_4$ to $Y_6$ may be a divalent organic group represented by the following Chemical Formula 10.

[Chemical Formula 10]

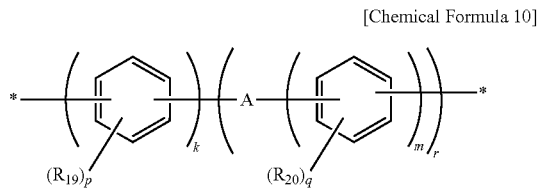

in Chemical Formula 10, $R_{19}$ and $R_{20}$ are each independently hydrogen, halogen, cyano, nitrile, an alkyl having 1 to 10 carbon atoms, an alkenyl having 2 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4. A is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and m are each independently an integer of 0 to 3, and r is an integer of 0 to 3.

In Chemical Formula 10, hydrogen may be bonded to carbon which is not substituted with $R_{19}$ or $R_{20}$. p and q are each independently an integer of 0 to 4, or 1 to 4, or 2 to 4, and when p or q is an integer of 2 to 4, a plurality of $R_{19}$ or $R_{20}$ may be the same or different substituents.

And, in Chemical Formula 10, k and m are each independently 0 to 3, preferably 0 to 1, and r can be an integer of 0 to 3, or 1 to 3.

Preferably, Chemical Formula 10 may be a functional group represented by the following Chemical Formula 10-1 or Chemical Formula 10-2.

[Chemical Formula 10-1]

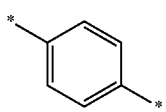

[Chemical Formula 10-2]

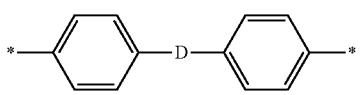

in Chemical Formula 10-2, D is $CH_2$.

Alternatively, the second repeating unit may include a combination of a diamine containing an imide-based aromatic divalent organic group containing imide group, and a tetracarboxylic dianhydride The diamine containing the imide-based aromatic divalent organic group is not particularly limited, but may be, for example, a diamine represented by the following Chemical Formula 9'.

[Chemical Formula 9']

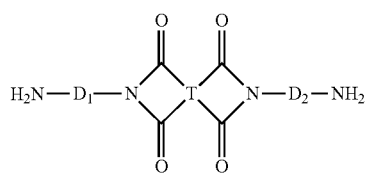

in Chemical Formula 9', T is a tetravalent organic group represented by Chemical Formula 8, $D_2$ and $D_2$ are each independently any one selected from an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms.

Specifically, in Chemical Formula 9'. T may be a functional group represented by the following Chemical Formula 7-1 or a functional group represented by the following Chemical Formula 7-2.

[Chemical Formula 7-1]

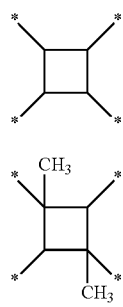

[Chemical Formula 7-2]

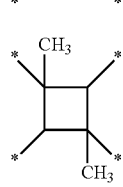

More specifically, examples of the diamine represented by Chemical Formula 9' are not particularly limited, but for example, it may be a diamine represented by the following Chemical Formula 9'-1 or Chemical Formula 9'-2.

[Chemical Formula 9'-1]

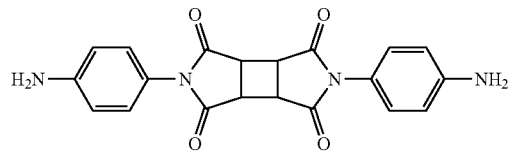

[Chemical Formula 9'-2]

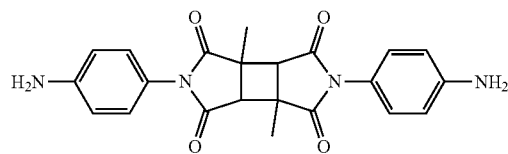

That is, the $Y_4$ to $Y_6$ may be an imide-based aromatic divalent organic group.

More specifically, the $Y_4$ to $Y_6$ may be a divalent organic group represented by the following Chemical Formula 9.

[Chemical Formula 9]

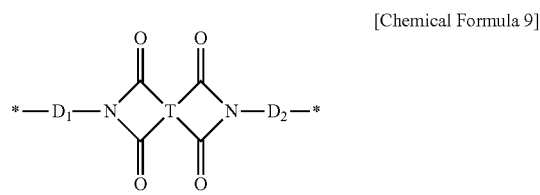

in Chemical Formula 9, T is a tetravalent organic group represented by Chemical Formula 8, and $D_1$ and $D_2$ are each independently any one selected from an alkylene group having 1 to 20 carbon atoms, a heteroalkylene group having 1 to 10 carbon atoms, a cycloalkylene group having 3 to 20 carbon atoms, an arylene group having 6 to 20 carbon atoms or a heteroarylene group having 2 to 20 carbon atoms.

When the polymer for liquid crystal aligning agent included in the liquid crystal alignment agent composition according to the embodiment is synthesized from a diamine containing an imide repeating unit which is already imidized, a coating film is formed, and then light irradiation is directly performed on the coating film without requiring a high temperature heat treatment process to generate anisotropy, and then, heat treatment is performed to complete an alignment film. Thus, a light irradiation energy can be significantly reduced, and also a liquid crystal alignment film having excellent alignment property and stability, excellent voltage holding ratio, and excellent electrical characteristics can be produced even by a simple process including one heat treatment process.

Specifically, in Chemical Formula 9, T may be a functional group represented by the following Chemical Formula 7-1 or a functional group represented by the following Chemical Formula 7-2.

[Chemical Formula 7-1]

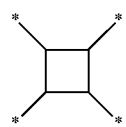

-continued

[Chemical Formula 7-2]

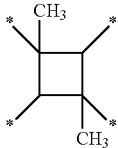

More specifically, examples of the organic group represented by Chemical Formula 9 are not particularly limited, but may be, for example, a functional group represented by the following Chemical Formula 9-1 or Chemical Formula 9-2.

[Chemical Formula 9-1]

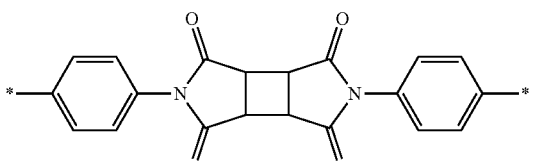

[Chemical Formula 9-2]

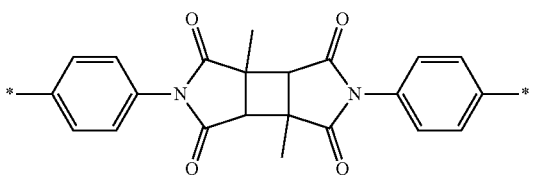

The repeating units represented by Chemical Formulas 4, 5 and 6 which are the second repeating units, may include the repeating unit represented by Chemical Formula 4 in an amount of 5 mol % to 74 mol %, or 10 mol % to 60 mol % with respect to the total repeating units.

As described above, when the polymer including the specific content of the imide repeating unit represented by Chemical Formula 4 is used, since the polymer for a liquid crystal alignment agent contained in the liquid crystal alignment agent composition includes a predetermined content of the imide repeating unit that is already imidized, it is possible to produce the liquid crystal alignment film having excellent alignment property and stability even by directly performing light irradiation while the high temperature heat treatment step is omitted.

If the content of the repeating unit represented by Chemical Formula 4 is less than the above-described content range, sufficient alignment property may not be exhibited and the alignment stability may be deteriorated. If the content of the repeating unit represented by Chemical Formula 4 is more than the above-described content range, it may cause a difficulty in manufacturing a stable alignment liquid that is able to be coated. Accordingly, it is preferred to include the repeating unit represented by Chemical Formula 4 within the above-described content range since it is possible to provide a polymer for a liquid crystal alignment agent in which all of storage stability, electrical characteristics, alignment property, and alignment stability are excellent.

Further, the repeating unit represented by Chemical Formula 5 or the repeating unit represented by Chemical Formula 6 may be included in an appropriate content depending on desired characteristics.

Specifically, the repeating unit represented by Chemical Formula 5 may have a content of 1 mol % to 60 mol %, preferably 5 mol % to 50 mol %, with respect to the repeating units represented by Chemical Formulas 4 to 6. A ratio at which the repeating unit represented by Chemical Formula 5 is converted to imide during the high-temperature heat treatment process after light irradiation is low, and thus, when the content thereof is more than the above-described range, the area interacting with the liquid crystal is lowered and so the alignment property can be relatively lowered. Accordingly, the repeating unit represented by Chemical Formula 5 may provide a polymer for a liquid crystal alignment agent capable of implementing high imidation rate while having excellent process characteristics within the above-described range.

Further, the repeating unit represented by Chemical Formula 6 may have a content of 0 mol % to 95 mol %, preferably 10 mol % to 80 mol %, with respect to the repeating units represented by Chemical Formulas 4 to 6. Within such a range, the repeating unit represented by Chemical Formula 6 can exhibit excellent coating property, thereby providing the polymer for a liquid crystal alignment agent capable of implementing a high imidization rate while having excellent process characteristics.

In this case, a molar ratio between a first repeating unit including at least one selected from the group consisting of a repeating unit represented by Chemical Formula 1, a repeating unit represented by Chemical Formula 2, and a repeating unit represented by Chemical Formula 3, and a second repeating unit including at least one selected from the group consisting of a repeating unit represented by Chemical Formula 4, a repeating unit represented by Chemical Formula 5 and a repeating unit represented by Chemical Formula 6 may be 1:99 to 99:1, 1:99 to 75:25, 1:99 to 50:50. That is, the liquid crystal alignment agent composition according to the embodiment may include a polymer for a liquid crystal alignment agent which contains the second repeating unit in excess or in the same amount as compared with the first repeating unit.

When the first repeating unit and the second repeating unit having such characteristics are used so as to satisfy the aforementioned molar ratio, the first repeating unit having excellent liquid crystal alignment properties and electrical characteristics, and the second repeating unit having excellent storage and alignment stability may be complemented with each other, and thus, not only it is possible to exhibit excellent coating property and achieve a high imidization rate while having excellent process characteristics, but also it is possible to produce a liquid crystal alignment film having excellent electrical characteristics such as afterimage and voltage holding ratio caused by a DC/AC voltage, and thus, produce a liquid crystal alignment film having more excellent alignment properties and electrical characteristics at the same time.

The weight average molecular weight (measured by a GPC) of each of the polymers for the liquid crystal aligning agent is not particularly limited, but may be, for example, 10000 g/mol to 200000 g/mol.

The liquid crystal alignment agent composition of the embodiment may include a crosslinker compound in addition to the aforementioned copolymer for liquid crystal aligning agent, and the crosslinker compound may have a specific chemical structure represented by Chemical Formula 11. The physical/chemical properties of the crosslinker compound are believed to be due to the specific structure of Chemical Formula 11.

In Chemical Formula 11, $A_1$ is a monovalent to tetravalent functional group, and j may be an integer of 1 to 4. The $A_1$ is a functional group positioned at the center of the crosslinker compound, and only j of the functional groups represented by curly bracket "[ ]" in Chemical Formula 11 may be bonded to the terminal functional group contained in $A_1$.

That is, in Chemical Formula 11, when j is 1, $A_1$ is a monovalent functional group. Also, when j is 2, $A_1$ is a divalent functional group. Further, when j is 3, $A_1$ is a trivalent functional group. Preferably, in Chemical Formula 11, j is 2, and $A_1$ may be an alkylene group having 1 to 10 carbon atoms, specifically, a butylene group.

In Chemical Formula 11, $L_5$ and $L_6$ are equal to or different from each other, and each independently, one of an alkylene group having 1 to 10 carbon atoms or an arylene group having 6 to 20 carbon atoms, preferably, $L_5$ and $L_6$ may be each independently an alkylene group having 1 to 5 carbon atoms, for example, an ethylene group.

In Chemical Formula 11, $R_{17}$ and $R_{18}$ are a functional group substituted for a hydrogen atom at the terminal of the hydroxyl group (—OH), which is a crosslinkable functional group of the crosslinker compound, and can suppress a crosslinking reaction between the copolymer for a liquid crystal alignment agent and the crosslinker compound represented by Chemical Formula 11.

As described later, the $R_{17}$ and $R_{18}$ may be desorbed while being replaced with a hydrogen atom when raising the temperature to 80° C. or higher through a drying step, an exposure step, a curing step, etc. for producing a liquid crystal alignment film from the liquid crystal alignment agent composition.

The $R_{17}$ and $R_{18}$ may each independently be a silicon-containing monovalent functional group.

Specifically, the silicon-containing monovalent functional group may be a functional group represented by the following Chemical Formula 12.

[Chemical Formula 12]

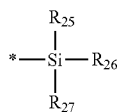

in Chemical Formula 12, $R_{25}$, $R_{26}$ and $R_{27}$ are each independently hydrogen or an alkyl having 1 to 10 carbon atoms. More specifically, in Chemical Formula 12, $R_{25}$, $R_{26}$ and $R_{27}$ may be a methyl group or an ethyl group.

In Chemical Formula 11, $A_1$ may be an alkylene group having 1 to 10 carbon atoms, and j may be 2. That is, the crosslinker compound represented by Chemical Formula 11 may include a compound represented by the following Chemical Formula 11-1.

[Chemical Formula 11-1]

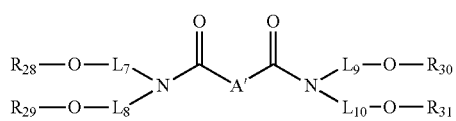

in Chemical Formula 11-1, A' is an alkylene group having 1 to 10 carbon atoms, $L_7$ to $L_{10}$ are each independently an alkylene group having 1 to 5 carbon atoms, and $R_2$ to $R_{31}$ may each independently be a silicon-containing monovalent functional group.

More specifically, as an example of the crosslinker compound represented by Chemical Formula 11-1, there may be mentioned a compound represented by the following Chemical Formula 12-2 wherein A' is a butylene group having 4 carbon atoms, $L_7$ to $L_{10}$ all are ethylene groups having 2 carbon atoms, and $R_{22}$ to $R_{25}$ all are functional groups represented by Chemical Formula 12 ($R_{19}$, $R_{20}$ and $R_{21}$ are methyl groups).

[Chemical Formula 12-2]

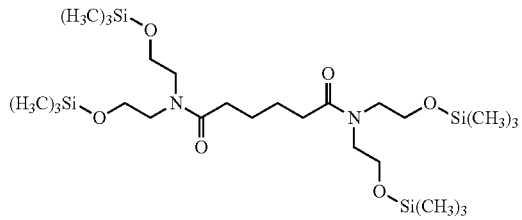

Further, as another example of the crosslinker compound represented by Chemical Formula 11-1, there may be mentioned a compound represented by the following Chemical Formula 12-3 wherein A' is a butylene group having 4 carbon atoms, $L_7$ to $L_{10}$ all are ethylene groups having 2 carbon atoms, and $R_{22}$ to $R_{25}$ are a functional group represented by Chemical Formula 12 ($R_{19}$, $R_{20}$ and $R_{21}$ are ethyl groups)

[Chemical Formula 12-3]

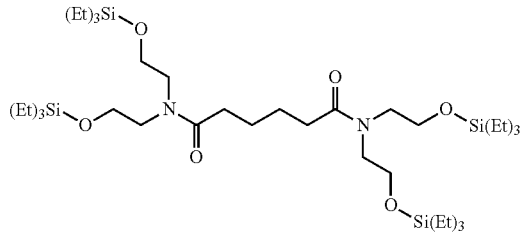

The crosslinker compound represented by Chemical Formula 11 may be contained in an amount of 1% by weight to 30% by weight, or 2% by weight to 25% by weight, or 3% by weight to 15% by weight, or 4% by weight to 10% by weight based on the total weight of the liquid crystal alignment agent composition. When the content of the crosslinker compound is excessively large, the flexibility of the polymer can be reduced as the degree of crosslinking of the copolymer for a liquid crystal alignment agent is excessively increased.

Meanwhile, when the content of the crosslinker compound is excessively small, it may be difficult to sufficiently realize the effect of improving mechanical strength and electrical characteristics due to an decrease in the degree of crosslinking of the polymer for a liquid crystal aligning agent.

In addition, the crosslinker compound represented by Chemical Formula 11 is added to an organic solvent to prepare a mixed solution. A permeability variation ratio before/after the addition of the mixed solution is calculated according to the following Equation 1 using a JASCO Asia Portal V-770 UV-VIS-NIR Spectrophotometer under the conditions of room temperature (25° C.) and a wavelength of 400 nm using a quartz cell, and the calculated permeability variation ratio may be 10% or less.

$$\text{Permeability Variation Ratio (\%)} = \text{Permeability of Solvent} - \text{Permeability of Mixed Solution.} \quad \text{[Equation 1]}$$

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents can be used alone or in combination of two or more.

2. Method of Preparing Liquid Crystal Alignment Film

In accordance with another embodiment of the invention, there is provided a method for preparing a liquid crystal alignment film including: a step of coating the liquid crystal alignment agent composition onto a substrate to form a coating film (step 1); a step of drying the coating film (step 2); a step of irradiating the dried coating film with light or subjecting the coating film to rubbing treatment to perform alignment treatment (step 3); and a step of heat-treating and curing the alignment-treated coating film (step 4).

Step 1 is a step of coating the liquid crystal alignment agent composition onto a substrate to form a coating film. The details of the liquid crystal alignment agent composition include all of those described above in one embodiment.

The method of coating the liquid crystal alignment agent composition onto a substrate is not particularly limited, and for example, a method such as screen printing, offset printing, flexographic printing, inkjet, and the like can be used.

Further, the liquid crystal alignment agent composition may be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone. N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

In addition, the liquid crystal alignment agent composition may further include other components in addition to the organic solvent. In a non-limiting example, when the liquid crystal alignment agent composition is coated, additives capable of improving the uniformity of the film thickness and the surface smoothness, or improving the adhesion between a liquid crystal alignment film and a substrate, or changing the dielectric constant and conductivity of a liquid crystal alignment film or increasing the denseness of a liquid crystal alignment film, may be further included. Examples of these additives include various kinds of solvents, surfactants, silane-based compounds, dielectrics or crosslinking compounds, etc.

Step 2 is a step of drying the coating film formed by coating the liquid crystal alignment agent composition onto a substrate.

The step of drying the coating film may be performed by a method such as heating of the coating film or vacuum evaporation, and is preferably performed at 50° C. to 150° C., or 60° C. to 140° C.

Step 3 is a step of irradiating the coating film with light to perform alignment treatment.

In the alignment treatment step, the coating film may mean a coating film immediately after the drying step, or may be a coating film subjected to the heat treatment after the drying step. The "coating film immediately after the drying step" refers to irradiating the light immediately after the drying step without carrying out a heat treatment at a temperature of higher than that of the drying step, and further steps other than the heat treatment can be added.

More specifically, when a liquid crystal alignment film is produced using a conventional liquid crystal alignment agent including polyamic acid or polyamic acid ester, it includes a step of irradiating light after essentially performing a high-temperature heat treatment for imidization of polyamic acid. However, when a liquid crystal alignment film is produced using the liquid crystal alignment agent of the one embodiment described above, it does not include the heat treatment step, and light is directly irradiated to perform alignment treatment, and then the alignment-treated coating film is cured by a heat treatment, thereby enabling production of a liquid crystal alignment film.

Further, in the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal alignment agent, and preferably energy of 10 mJ/cm$^2$ & to 10 J/cm$^2$, or energy of 30 mJ/cm$^2$ to 2 J/cm$^2$ may be irradiated.

As for the ultraviolet rays, polarized ultraviolet rays selected among the ultraviolet rays subjected to polarization treatment by a method of passing through or reflecting with a polarizing device using a substrate in which a dielectric anisotropic material is coated on the surface of a transparent substrate such as quartz glass, soda lime glass, soda lime-free glass, etc., a polarizer plate on which aluminum or metal wires are finely deposited, or a Brewster's polarizing device using the reflection of quartz glass, etc., are irradiated to perform the alignment treatment. Herein, the polarized ultraviolet rays may be irradiated perpendicularly to the surface of the substrate, or may be irradiated by forming an angle of incidence toward a specific angle. By this method, the alignment ability of the liquid crystal molecules is imparted to the coating film.

Further, in the alignment treatment step, a rubbing treatment can be performed by a method using a rubbing cloth. More specifically, in the rubbing treatment, the surface of the coating film after the heat treatment step can be rubbed in one direction while rotating a rubbing roller in which a rubbing cloth is attached to a metal roller.

Step 4 is a step of heat-treating and curing the alignment-treated coating film.

In the step of heat-treating and curing the alignment-treated coating film, the $R_{17}$ and $R_{18}$ functional groups of the crosslinker compound represented by Chemical Formula 11 may be desorbed while being substituted with a hydrogen atom in the alignment-treated coating film, and a crosslinking reaction between the copolymers for liquid crystal alignment agents may proceed.

Specifically, in the step of heat-treating and curing the alignment-treated coating film, the alignment-treated coating film may include a crosslinker compound represented by the following Chemical Formula 13.

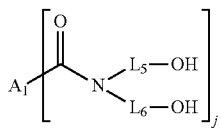

[Chemical Formula 13]

in Chemical Formula 13, $A_1$, j, $L_5$ and $L_5$ are as defined in Chemical Formula 14 of the above embodiment.

When the crosslinker compound represented by Chemical Formula 13 is included in the liquid crystal alignment agent composition of the embodiment, as some crosslinking reactions proceed from within the composition, it becomes difficult for the crosslinker compound to be evenly dispersed in the composition.

Meanwhile, according to the present invention, in the liquid crystal alignment agent composition, the crosslinking reaction in the composition is suppressed by adding a crosslinker compound represented by Chemical Formula 11, and then in the step of heat-treating and curing the alignment-treated coating film, the crosslinker compound represented by Chemical Formula 11 may be induced so as to be converted into a crosslinker compound represented by Chemical Formula 13. Thereby, the composition can improve the dispersibility and stability of the crosslinker compound, and in the alignment film, the effect of improving the film strength can be achieved through the formation of a crosslinked structure.

The step of heat-treating and curing the alignment-treated coating film is a step that is performed after light irradiation even in a conventional method of preparing a liquid crystal alignment film using a polymer for a liquid crystal alignment agent containing a polyamic acid or a polyamic acid ester, and is distinguished from the heat treatment step that is performed by coating a liquid crystal alignment agent onto a substrate, and then performing imidization of the liquid crystal alignment agent before irradiating the light or while irradiating the light.

In this case, the heat treatment may be performed by a heating means such as a hot plate, a hot-air circulation furnace, an infrared furnace and the like, and the heat treatment may be performed at 150° C. to 300° C., or 200° C. to 250° C.

Meanwhile, the method may further include heat-treating the coating film immediately after the drying step at a temperature equal to or higher than that of the drying step, if necessary, after a step of drying the coating film (step 2). The heat treatment may be performed by a heating means such as a hot plate, a hot-air circulation furnace, an infrared furnace and the like, and the heat treatment may be performed at 150° C. to 250° C. In this process, the liquid crystal alignment agent can be imidized.

That is, the method for preparing the liquid crystal alignment film may include: a step of coating the liquid crystal alignment agent onto a substrate to form a coating film (step 1); a step of drying the coating film (step 2): a step of heat-treating the coating film immediately after the drying step at a temperature equal to or higher than the drying step (step 3): a step of irradiating the heat-treated coating film or subjecting the heat-treated coating film to a rubbing treatment to perform alignment treatment (step 4); and a step of heat-treating and curing the alignment-treated coating film (step 5).

3. Liquid Crystal Alignment Film

Further, the present invention may provide a liquid crystal alignment film prepared in accordance with the method for preparing a liquid crystal alignment film described above. Specifically, the liquid crystal alignment film may include an aligned cured product of the liquid crystal alignment agent composition of the one embodiment. The aligned cured product means a material obtained through an alignment step and a curing step of the liquid crystal alignment agent composition of the one embodiment.

As described above, when a liquid crystal alignment agent composition including a copolymer for liquid crystal alignment agent; and a crosslinker compound represented by Chemical Formula 11 is used, it is possible to prepare a liquid crystal alignment film having enhanced stability and exhibiting excellent electrical characteristics.

The thickness of the liquid crystal alignment film is not particularly limited, but for example, it can be freely adjusted within the range of 0.01 μm to 1000 μm. For example, it may be 0.01 μm to 0.3 μm. When the thickness of the liquid crystal alignment film increases or decreases by a specific value, the physical properties measured in the alignment film may also change by a certain value.

The liquid crystal alignment film has a film strength calculated by the following Equation 2 of 0.10% or less, or 0.01% or more and 0.10% or less, 0.01% or more and 0.05% or less, or 0.01% or more and 0.04% or less, or 0.02% or more and 0.04% or less.

Film Strength=Haze of the Liquid Crystal Alignment Film after Rubbing Treatment−Haze of Liquid Crystal Alignment Film before Rubbing Treatment   [Equation 2]

For the rubbing treatment of the liquid crystal alignment film, a method of performing rubbing treatment while rotating the surface of the alignment film at 1000 rpm using a rubbing machine (Sindo Engineering) can be used, and the haze value can be measured using a hazemeter.

In addition, in the liquid crystal alignment layer, the film density measured by PANalytical X'Pert PRO MRD XRD under conditions of 45 kV, 40 mA Cu Kα radiation (wavelength: 1.54 Å) may be 1.25 g/cm³ or more, or 1.25 g/cm³ or more and 1.50 g/cm³ or less, or 1.26 g/cm³ or more and 1.50 g/cm³ or less, or 1.26 g/cm³ or more and 1.40 g/cm³ or less, or 1.26 g/cm³ or more and 1.35 g/cm³ or less, or 1.26 g/cm³ or more and 1.34 g/cm³ or less.

In the liquid crystal alignment film of the one embodiment, when the film density measured by PANalytical X'Pert PRO MRD XRD under the conditions of 45 kV, 40 mA Cu Kα radiation (wavelength: 1.54 Å) is 1.25 g/cm³ or more and satisfies the above-mentioned range, the film strength is increased, the shielding power by the eluting gas of the lower film is increased, an effect of maintaining the alignment reliability for a long time can be realized.

4. Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal alignment agent composition of the one embodiment, thereby achieving excellent stability together with excellent various physical properties. Specifically, the liquid crystal display device which can have a high voltage holding ratio at a high temperature and a low frequency, has excellent electrical characteristics, reduces performance degradation of a contrast ratio or an image sticking (after-image) phenomenon, and further has excellent film strength, can be provided.

Specifically, the voltage holding ratio of the liquid crystal display device measured at 1V, 1 Hz, and 60° C. using 6254C instrument available from TOYO CORPORATION may be 90% or more, or 93% or more and 99% or less, 94% or more and 99% or less, or 94% or more and 98% or less. When the voltage holding ratio of the liquid crystal display device measured at 1V, 1 Hz, and 60° C. using 6254C instrument available from TOYO CORPORATION is reduced to less than 90%, it may be difficult to implement a liquid crystal display device having high quality driving characteristics at low power.

Polarizing plates were attached on the upper and lower plates of the liquid crystal display device to be vertical to each other, and then attached on a backlight of 7,000 cd/m². Then, a difference between the initial luminance (L0) which is the luminance in a black mode measured using PR-880 equipment, and the final luminance ($L_1$) which is the luminance in a black mode measured after driven for 24 hours at an AC voltage of 5V is divided by the initial luminance (L0), and multiplied by 100, thereby calculating the luminance fluctuation rate, and the thus-calculated luminance fluctuation rate may be less than 10%.

Advantageous Effects

According to the present invention, a liquid crystal alignment agent composition having excellent liquid crystal alignment property, durability and electrical characteristics while having excellent film strength, and also having excellent shielding power through high film density, a method for preparing a liquid crystal alignment film using the same, and a liquid crystal alignment film and a liquid crystal display device using the same.

DETAILED DESCRIPTION OF THE EMBODIMENTS

The prevention invention will be described in more detail by way of Examples. However, these Examples are given for illustrative purposes only, and the scope of the invention is not intended to be limited to or by these Examples.

Preparation Example

Preparation Example 1: Preparation of Diamine DA1-1

Diamine DA1-1 was synthesized according to Reaction Scheme 1 below:

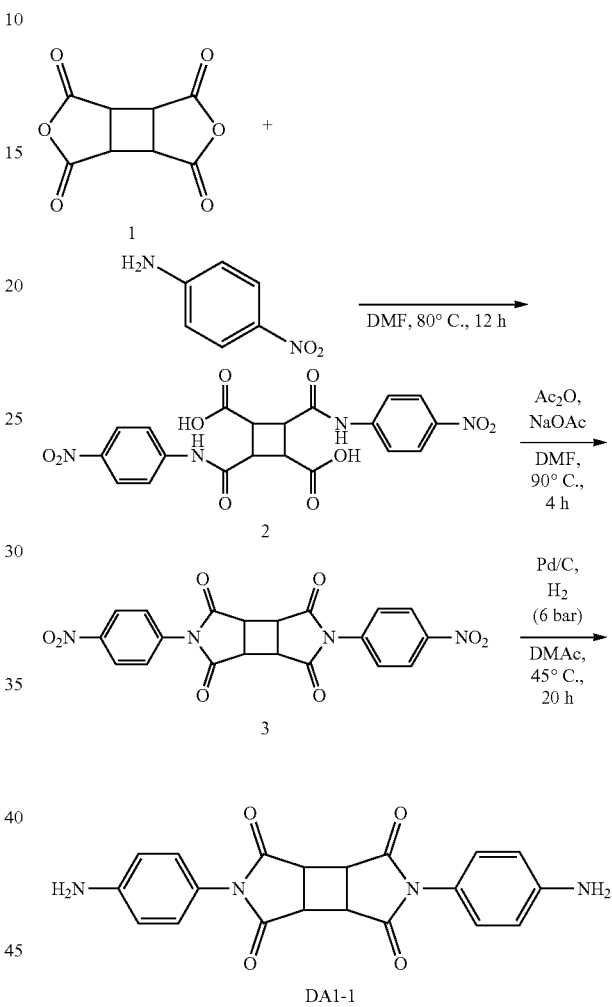

Specifically, cyclobutane-1,2,3,4-tetracarboxylic dianhydride (CBDA, Compound 1) and 4-nitroaniline were dissolved in dimethylformamide (DMF) to prepare a mixture. Then, the mixture was reacted at about 80° C. for about 12 hours to prepare an amic aid of Formula 2. Then, the amic acid was dissolved in DMF, and acetic anhydride and sodium acetate were added thereto, thereby preparing a mixture. Then, the amic acid included in the mixture was imidized at about 90° C. for about 4 hours obtain Compound 3. The thus-obtained imide of Compound 3 was dissolved in dimethylacetamide (DMAc), and then Pd/C was added thereto, thereby preparing a mixture. The mixture was reduced at 45° C. and under hydrogen pressure of 6 bar for 20 minutes, thereby preparing the diamine DA1-1.

Preparation Example 2: Preparation of Diamine DA1-2

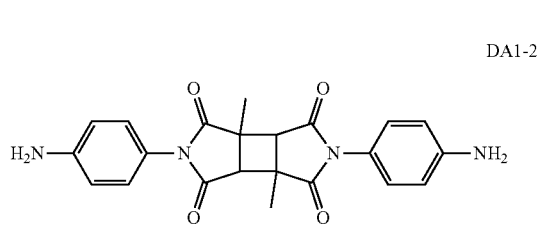

DA1-2

A diamine DA1-2 having the above structure was prepared in the same manner as in Preparation Example 1 except that 1,3-dimethylcyclobutane-1,2,3,4-tetracarboxylic dianhydride (DMCBDA) was used instead of cyclobutane-1,2,3,4-tetracarboxylic dianhydride (CBDA).

Preparation Example 3: Synthesis of Diamine DA2-1

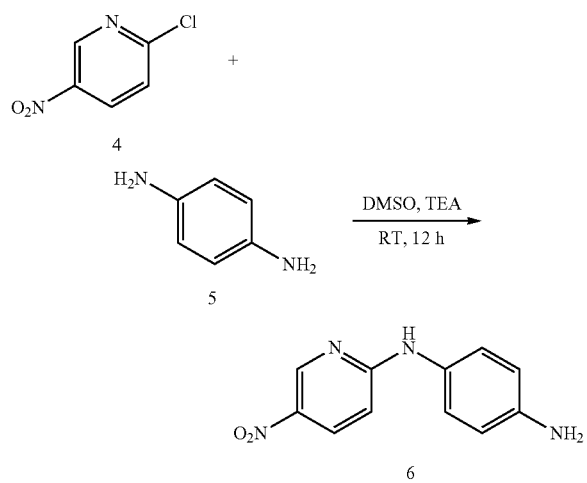

18.5 g (0.1 mol) of 4-nitrobenzoyl chloride (Compound 4) and 11.13 g (0.11 mol) of triethylamine were dissolved in dioxane (450 mL), and then 13.91 g (0.1 mol) of 5-nitropyridin-2-amine (Compound 5) was added thereto, and the mixture was stirred at 60° C. for 1 hour. When the reaction was completed, the reaction mixture was slowly added to a vessel containing water (1000 mL) and stirred for 1 hour. It was filtered and the obtained solid was washed with ultra-pure water (200 mL) to give 24.54 g of 4-nitro-N-(5-nitropyridin-2-yl)benzamide (Compound 6) (yield: 85%).

After the 4-nitro-N-(5-nitropyridin-2-yl)benzamide (Compound 6) was dissolved in THF (100 mL), Pd/C (2.5 g) was added thereto, and the mixture was stirred for 12 hours under a hydrogen environment. After completion of the reaction, the resulting mixture was filtered through a celite pad, and the filtrate was concentrated to give Diamine DA2-1 (yield: 84%).

Preparation Example 4: Synthesis of Diamine DA2-2

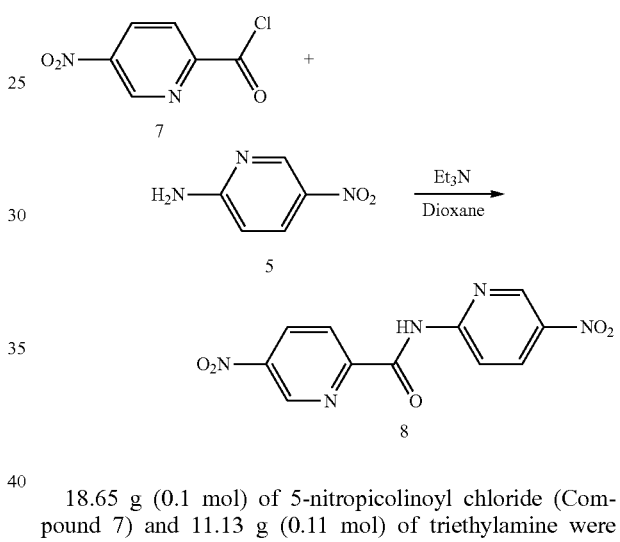

18.65 g (0.1 mol) of 5-nitropicolinoyl chloride (Compound 7) and 11.13 g (0.11 mol) of triethylamine were dissolved in dioxane (450 mL), and then 13.91 g (0.1 mol) of 5-nitropyridin-2-amine (Compound 5) was added thereto, and the mixture was stirred at 60° C. for 1 hour. When the reaction was completed, the reaction mixture was slowly added to a vessel containing water (1000 mL) and stirred for 1 hour. It was filtered and the obtained solid was washed with ultrapure water (200 mL) to give 25.68 g of 5-nitro-N-(5-nitropyridin-2-yl)picolinamide (Compound 8) (yield: 88.79%).

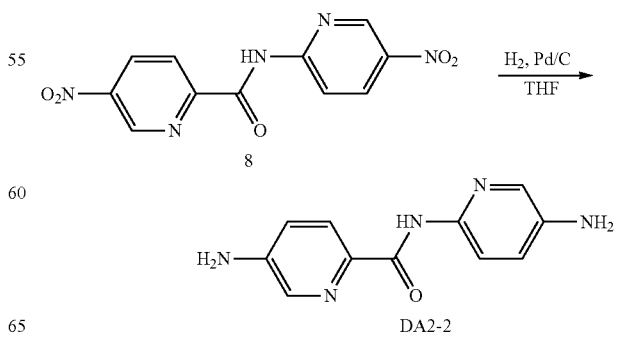

After the 5-nitro-N-(5-nitropyridin-2-yl)picolinamide (Compound 8) was dissolved in THF (100 mL), Pd/C (1.5 g) was added thereto, and the mixture was stirred for 12 hours under a hydrogen environment. After completion of the reaction, the resulting mixture was filtered through a celite pad, and the filtrate was concentrated to give Diamine DA2-2 (yield: 90.7%).

Preparation Example 5: Synthesis of Diamine DA2-3

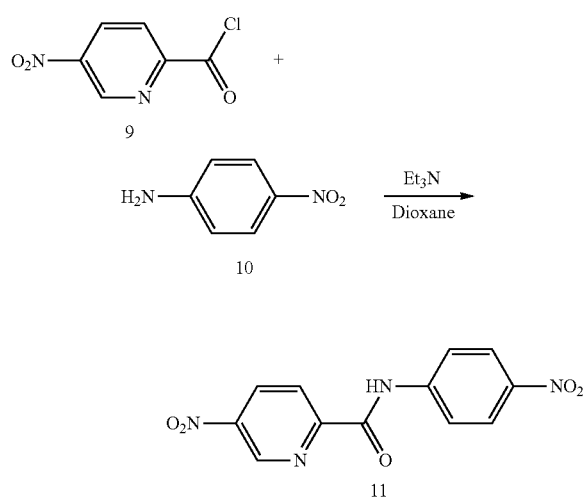

18.65 g (0.1 mol) of 5-nitropicolinoyl chloride (Compound 9) and 11.13 g (0.11 mol) of triethylamine were dissolved in dioxane (450 mL), and then 13.81 g (0.1 mol) of 4-nitroaniline (Compound 10) was added thereto, and the mixture was stirred at 60° C. for 1 hour. When the reaction was completed, the reaction mixture was slowly added to a vessel containing water (1000 mL) and stirred for 1 hour. It was filtered and the obtained solid was washed with ultrapure water (200 mL) to give 24.41 g of 5-nitro-N-(4-nitrophenyl)picolinamide (Compound 11) (yield: 84.69%).

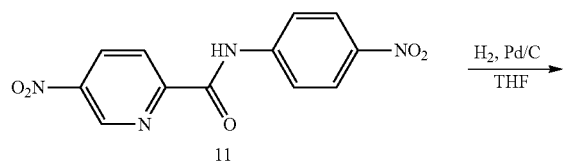

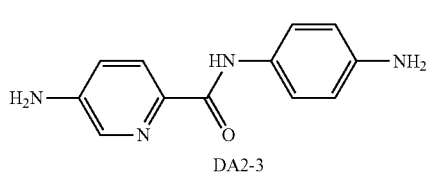

After the 5-nitro-N-(4-nitrophenyl)picolinamide (Compound 11) was dissolved in THF (100 mL), Pd/C (1.5 g) was added thereto, and the mixture was stirred for 12 hours under a hydrogen environment. After completion of the reaction, the resulting mixture was filtered through a celite pad, and the filtrate was concentrated to give Diamine DA2-3 (yield: 89.48%).

Preparation Example 6: Preparation of Crosslinker

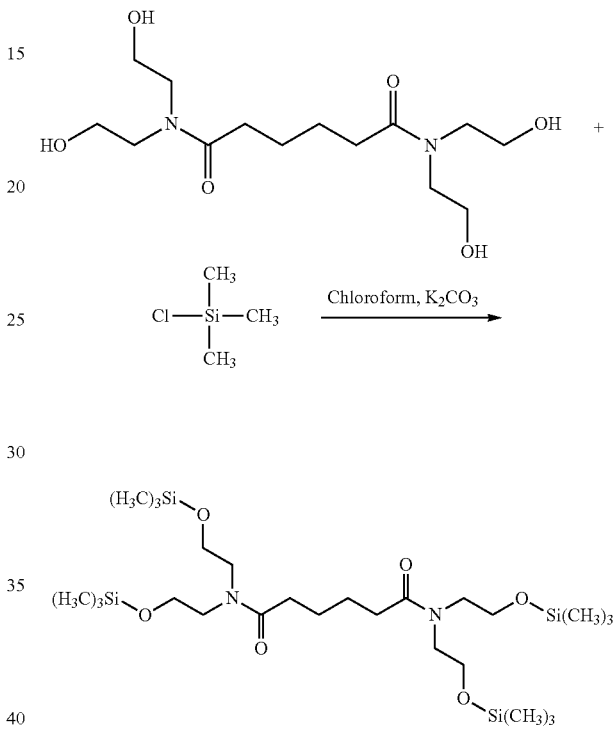

5 g (15.6 mmol) of N,N,N',N'-tetrakis(2-hydroxyethyl)adipamide and 10.2 g (94 mmol) of chlorotrimethylsilane were added to chloroform (150 ml), and then potassium carbonate ($K_2CO_3$, 17.3 g, 125 mmol) was added thereto, and the mixture was stirred at 0° C. for 10 hours under a nitrogen atmosphere. After completion of the reaction, the reaction mixture was filtered through a celite pad, and the filtrate was concentrated to give 7.3 g of N1,N1,N6,N6-tetrakis(2-(trimethylsilyloxy)ethyl)adipamide (yield: 77%).

Comparative Preparation Example 1: Preparation of Crosslinker

N,N,N',N'-Tetrakis(2-hydroxyethyl)adipamide which is a reactant of Preparation Example 6 was used as a crosslinker of Preparation Example 1.

Synthesis Example

The polymer for a liquid crystal alignment agent was synthesize using the reactant shown in Table 1 below. Specific synthesis conditions of each of Synthesis Examples 1 to 7 are shown in Table 1 below.

TABLE 1

| Synthesis Example | First diamine (mol %) | Second diamine (mol %) | Acid anhydride (mol %) |
|---|---|---|---|
| Synthesis Example1(P-1) | Preparation Example 3(10) | p-PDA(90) | DMCBDA(100) |
| Synthesis Example2(P-2) | Preparation Example 3(10) | MDA(90) | DMCBDA(100) |
| Synthesis Example3(P-3) | Preparation Example 3(10) | MDA(90) | DMCBDA(50)PMDA(50) |
| Synthesis Example4(P-4) | Preparation Example 3(10) | Preparation Example 2(90) | DMCBDA(100) |
| Synthesis Example5(P-5) | Preparation Example 3(50) | Preparation Example 2(50) | DMCBDA(100) |
| Synthesis Example6(P-6) | Preparation Example 3(50) | Preparation Example 2(50) | DMCBDA(100) |
| Synthesis Example7(R-1) | | p-PDA(100) | DMCBDA(100) |
| Synthesis Example8(R-2) | | Preparation Example 2(100) | DMCBDA(100) |

Synthesis Examples 1 to 8: Synthesis of Polymer for Liquid Crystal Alignment Agent Synthesis Example 1: Preparation of Polymer for Liquid Crystal Alignment Agent P-1

2.28 g (0.01 mol) of DA2-1 prepared in Preparation Example 3 and 9.337 g (0.0086 mol) of p-phenylenediamine (p-PDA) were completely dissolved in 177.128 g of anhydrous N-methyl pyrrolidone (NMP).
Then, 20.0 g (0.089 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent P-1.

Synthesis Example 2: Preparation of Polymer for Liquid Crystal Alignment Agent P-2

2.28 g (0.01 mol) of DA2-1 prepared in Preparation Example 3 and 17.119 g (0.086 mol) of anhydrous N-methyl pyrrolidone (NMP) were completely dissolved in 221.225 g of anhydrous N-methyl pyrrolidone (NMP).
Then, 20.0 g (0.089 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent P-2.

Synthesis Example 3: Preparation of Polymer for Liquid Crystal Alignment Agent P-3

2.28 g (0.01 mol) of DA2-1 prepared in Preparation Example 3 and 17.119 g (0.086 mol) of 4,4'-methylenedianiline (MDA) were completely dissolved in 221.225 g of anhydrous N-methyl pyrrolidone (NMP).
Then, 10.0 g (0.045 mol) of 1,3-dimethyl-cyclobutane-1,2,3,4-tetracarboxylic dianhydride (DMCBDA) and 9.73 g (0.045 mol) of pyromellitic dianhydride (PMDA) were added to the solution under an ice bath, and the mixture was stirred at room temperature for 16 hours to give a polymer for a liquid crystal aligning agent P-3.

Synthesis Example 4: Preparation of Polymer for Liquid Crystal Alignment Agent P-4

2.28 g (0.01 mol) of DA2-1 prepared in Preparation Example 3 and 34.918 g (0.089 mol) of DA1-2 prepared in Preparation Example 2 were completely dissolved in 322.091 g of anhydrous N-methyl pyrrolidone (NMP).
Then, 20.0 g (0.089 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent P-4.

Synthesis Example 5: Preparation of Polymer for Liquid Crystal Alignment Agent P-5

8.211 g (0.036 mol) of DA2-1 prepared in Preparation Example 3 and 14.549 g (0.036 mol) of DA1-2 prepared in Preparation Example 2 were completely dissolved in 208.269 g of anhydrous N-methyl pyrrolidone (NMP).
Then, 15.0 g (0.067 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent P-5.

Synthesis Example 6: Preparation of Polymer for Liquid Crystal Alignment Agent P-6

10.948 g (0.048 mol) of DA2-1 prepared in Preparation Example 3 and 19.399 g (0.048 mol) of DA1-2 prepared in Preparation Example 2 were completely dissolved in 276.163 g of anhydrous N-methyl pyrrolidone (NMP).
Then, 10.0 g (0.045 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent P-6.

Synthesis Example 7: Preparation of Polymer for Liquid Crystal Alignment Agent R-1

19.211 g (0.0096 mol) of p-phenylenediamine (p-PDA) was completely dissolved in 222.194 g of anhydrous N-methyl pyrrolidone (NMP).

Then, 20.0 g (0.089 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent R-1.

Synthesis Example 8: Preparation of Polymer for Liquid Crystal Alignment Agent R-2

29.099 g (0.072 mol) of DA2-1 prepared in Preparation Example 2 was completely dissolved in 249.893 g of anhydrous N-methyl pyrrolidone (NMP).

Then, 15.0 g (0.067 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal aligning agent R-2.

Examples and Comparative Examples: Preparation of Liquid Crystal Alignment Agent Composition, Liquid Crystal Alignment Film, Liquid Crystal Alignment Cell Examples 1 to 6

(1) Preparation of Liquid Crystal Alignment Agent Composition

With a composition as shown in Table 2 below, the polymer for a liquid crystal alignment agent was dissolved in a mixed solvent of NMP, GBL and 2-butoxyethanol to obtain a solution. Then, to the solution, N1,N1,N6,N6-tetrakis(2-(trimethylsilyloxy)ethyl)adipamide obtained in Preparation Example 6 as a crosslinker was added in an amount of 5% by weight based on the total solution, and then the mixture was stirred at 25° C. for 16 hours. Then, the obtained solution was pressure-filtered through a filter made of poly(tetrafluorene ethylene) and having a pore size of 0.1 μm, thereby preparing a liquid crystal alignment agent composition.

(2) Preparation of Liquid Crystal Alignment Film

The liquid crystal alignment agent composition was coated onto each of the upper and lower substrates for the voltage holding ratio (VHR) in which an ITO electrode having a thickness of 60 nm and an area of 1 cm×1 cm was patterned on a rectangular glass substrate having a size of 2.5 cm×2.7 cm using a spin coating method. Then, the substrates onto which the liquid crystal alignment agent composition was coated were placed on a hot plate at about 80° C. and dried for 3 minutes to evaporate the solvent.

In order to subject the thus-obtained coating film to alignment treatment, ultraviolet rays of 254 nm were irradiated with an intensity of about 0.1 to 1 J/cm$^2$ using an exposure apparatus in which a linear polarizer was adhered to the coating film of each of the upper/lower plates. Subsequently, the alignment-treated upper/lower plates were calcinated (cured) in an oven at about 230° C. for 30 minutes to obtain a coating film having a thickness of 0.1 μm.

(3) Preparation of Liquid Crystal Alignment Cell

A sealing agent impregnated with ball spacers having a size of 4.5 μm was coated onto the edge of the upper plate excluding the liquid crystal injection hole. Then, the alignment films formed on the upper plate and the lower plate were aligned such that they faced each other and the alignment directions were aligned with each other, and then the upper and lower plates were bonded together and the sealing agent was UV and heat cured to prepare an empty cell. Then, a liquid crystal was injected into the empty cells and the injection hole was sealed with a sealing agent to prepare a liquid crystal alignment cell.

Comparative Example 1

A liquid crystal alignment agent composition, a liquid crystal alignment film, and a liquid crystal alignment cell were produced in the same manner as in Example 1, except that the crosslinker of Preparation Example 6 was not added.

Comparative Example 2

A liquid crystal alignment agent composition, liquid crystal alignment film, and a liquid crystal alignment cell were produced in the same manner as in Example 1, except that N,N,N',N'-tetrakis(2-hydroxyethyl)adipamide of Comparative Preparation Example 1 was added instead of the crosslinker of Preparation Example 6.

TABLE 2

| Category | Polymer for liquid crystal alignment agent | Crosslinker Kind | Addition amount (wt %) |
|---|---|---|---|
| Example 1 | Synthesis Example 1(P-1) | Preparation Example 6 | 5 |
| Example 2 | Synthesis Example 2(P-2) | Preparation Example 6 | 5 |
| Example 3 | Synthesis Example 3(P-3) | Preparation Example 6 | 5 |
| Example 4 | Synthesis Example 4(P-4) | Preparation Example 6 | 5 |
| Example 5 | Synthesis Example 5(P-5) | Preparation Example 6 | 5 |
| Example 6 | Synthesis Example 6(P-6) | Preparation Example 6 | 5 |
| Comparative Example 1 | Synthesis Example 1(P-1) | — | — |
| Comparative Example 2 | Synthesis Example 1(P-1) | 비교 Preparation Example 1 | 5 |

Experimental Example

1) Evaluation of Liquid Crystal Alignment Properties

Polarizers were adhered to the upper and lower plates of the liquid crystal cell prepared above so as be perpendicular to each other. The liquid crystal cell to which the polarizing plates were adhered was then placed on a backlight with luminance of 7000 cd/m$^2$, and light leakage was observed with the naked eye. At this time, if the alignment properties of the liquid crystal alignment film are excellent and the liquid crystal is arranged well, light is not passed through the upper and lower polarizing plates adhered vertically to each other, and it is observed dark without defects. In this case, the alignment properties are evaluated as 'good', and when light leakage such as liquid crystal flow mark or bright spot is observed, it is evaluated as 'poor'. The results are shown in Table 3 below.

2) Measurement of Voltage Holding Ratio (VHR)

The voltage holding ratio (VHR) which is an electrical characteristic of the prepared liquid crystal alignment cell was measured at 1V, 1 Hz, and 60° C. using 6254C instrument available from TOYO CORPORATION (VHR 60° C. 1 Hz n-LC conditions). Measurement results of the voltage holding ratio (VHR) of the liquid crystal alignment cell are shown in Table 3 below.

3) Evaluation of Alignment Stability (AC Afterimage)

Polarizing plates were adhered to the upper plate and lower plate of the prepared liquid crystal cell so as to be perpendicular to each other. The liquid crystal cell to which the polarizing plates were adhered was adhered onto a backlight of 7000 cd/m², and the luminance in a black mode was measured using a PR-880 equipment which is a device for measuring the luminance. Then, the liquid crystal cell was driven at room temperature for 120 hours with an AC voltage of 7 V. Thereafter, the luminance in a black mode was measured in the same manner as described above in a state in which the voltage of the liquid crystal cell was turned off. The difference between the initial luminance (L0) measured before driving the liquid crystal cell and the final luminance (L1) measured after driving the liquid cell was divided by the value of the initial luminance (L0) and multiplied by 100, thereby calculating the luminance fluctuation rate. As the thus-calculated luminance fluctuation rate is closer to 0%, it means that the alignment stability is excellent. The level of afterimage was evaluated through the measurement result of such luminance fluctuation rate according the following criteria. It is desirable to minimize AC afterimage, and in the measurement results, it was evaluated as "excellent" if the luminance fluctuation rate was less than 10%, as "ordinary" if the luminance fluctuation rate was 10% or more and 20% or less, and as "poor" if the luminance fluctuation rate was more than 20%. The results are shown in Table 3 below.

4) Solubility

The crosslinkers used in the liquid crystal alignment agent composition of each of Examples and Comparative Examples was added to a solvent (γ-butyrolactone) so as to satisfy the addition amount of the crosslinker of Table 2, and then mixed for 10 seconds to prepare a mixed solution. A permeability variation ratio before/after the addition of the mixed solution was calculated according to the following Equation 1 using ASCO Asia Portal V-770 UV-VIS-NIR Spectrophotometer under the conditions of room temperature (25° C.) and a wavelength of 400 nm using a quartz cell.

Permeability Variation Ratio (%)=Permeability of Solvent−Permeability of Mixed Solution. [Equation 1]

Excellent: Permeability variation ratio of 10% or less
Ordinary: Permeability variation ratio of more than 10% and 20$ or less
Bad: Permeability variation ratio of more than 20%

5) Film Strength

With respect to the liquid crystal alignment film, a sample was fixed to a sample holder using a PANalytical X'Pert PRO MRD XRD instrument under the conditions of 45 kV and a current of 40 mA Cu Kα radiation (wavelength: 1.54 Å) for measurement using a magnet. Next, it was mounted on the sample stage. Z→omega→z alignment was performed for alignment, and then for XRR measurement, the film density was measured within the range of $0.1°≤2θ≤1°$ with a step size of 0.002° and time per step for 1 second. The sample was measured for precise measurement, and then measured once more while rotating at 90 degrees.

6) Film Strength

The above-prepared liquid crystal alignment film was subjected to rubbing treatment while rotating the surface of the alignment film at 1000 rpm using a rubbing machine (Sindo Engineering). Then, a haze value was measured using hazemeter, and the difference from the haze value before the rubbing treatment was calculated as in the following Equation to evaluate a film strength. The smaller the haze change value, the better the film strength.

Film Strength=Haze of the Liquid Crystal Alignment Film after Rubbing Treatment−Haze of Liquid Crystal Alignment Film before Rubbing Treatment [Equation 2]

TABLE 3

| Category | Liquid crystal alignment property | Alignment stability | VHR(%) | Solubility | Film density (g/cm³) | Film strength (%) |
| --- | --- | --- | --- | --- | --- | --- |
| Example 1 | Good | Excellent | 95 | Excellent | 1.34 | 0.02 |
| Example 2 | Good | Excellent | 94 | Excellent | 1.34 | 0.02 |
| Example 3 | Good | Excellent | 98 | Excellent | 1.33 | 0.03 |
| Example 4 | Good | Excellent | 94 | Excellent | 1.31 | 0.02 |
| Example 5 | Good | Excellent | 97 | Excellent | 1.26 | 0.04 |
| Example 6 | Good | Excellent | 95 | Excellent | 1.28 | 0.03 |
| Comparative Example 1 | Good | Excellent | 74 | — | 1.14 | 0.12 |
| Comparative Example 2 | Good | Excellent | 94 | Bad | 1.21 | 0.04 |

As shown in Table 3 above, it was confirmed that in Examples 1 to 6 in which the crosslinker of Preparation Example 6 was contained together with a polyimide-based copolymer including two kinds of repeating units derived from two kinds of diamines, it exhibits a high voltage holding ratio of 94% to 98% together with excellent liquid crystal alignment property and alignment stability. In addition, it was confirmed that the haze change value before and after the rubbing treatment was very low, from 0.02% to 0.04%, together with a high film density of 1.26 g/d to 1.34 g/d, indicating excellent film strength.

On the other hand, it was confirmed that in the alignment film obtained from the liquid crystal alignment agent composition of Comparative Example 1 in which the crosslinker of Preparation Example 6 is not contained, the haze change value before and after the rubbing treatment sharply increased to 0.12%, so that not only the film strength was very poor, but also the voltage holding ratio sharply decreased to 74%, resulting in poor electrical characteristics.

Further, it was confirmed that in the alignment film obtained from the liquid crystal alignment agent composition of Comparative Example 2 containing the crosslinker of the Comparative Preparation Example 1 instead of the crosslinker of Preparation Example 6, the film density appears at 1.21 g/d, which is not only poor compared to Examples of the present invention but also has significantly poor solubility compared to the crosslinker of Preparation Example 6.

The invention claimed is:

1. A liquid crystal alignment agent composition comprising:
a copolymer for liquid crystal alignment agent containing a first repeating unit including at least one selected from the group of a repeating unit represented by Chemical Formula 1, a repeating unit represented by Chemical Formula 2, or a repeating unit represented by Chemical Formula 3, and a second repeating unit including at least one selected from the group of a repeating unit represented by Chemical Formula 4, a repeating unit represented by Chemical Formula 5, or a repeating unit represented by Chemical Formula 6; and
a crosslinker compound represented by Chemical Formula 11:

[Chemical Formula 1]

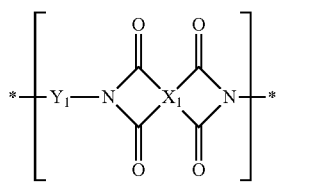

[Chemical Formula 2]

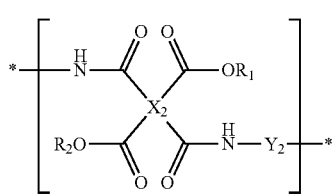

[Chemical Formula 3]

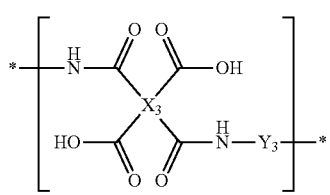

[Chemical Formula 4]

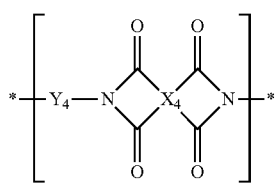

[Chemical Formula 5]

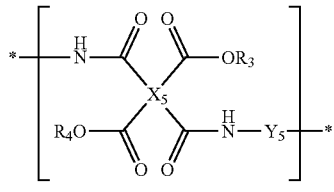

[Chemical Formula 6]

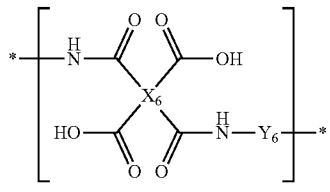

at least one of $R_1$ and $R_2$ is an alkyl group having 1 to 10 carbon atoms and the other is hydrogen, at least one of $R_3$ and $R_4$ is an alkyl group having 1 to 10 carbon atoms and the other is hydrogen, and $X_1$ to $X_6$ are each independently a tetravalent organic group represented by any one of Chemical Formula 7,

[Chemical Formula 7]

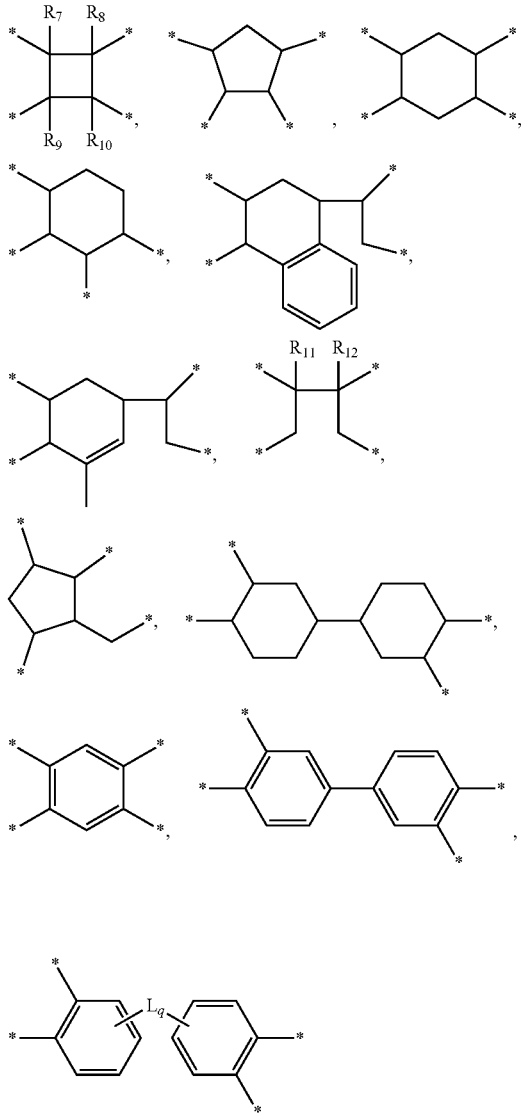

in the Chemical Formula 7, $R_7$ to $R_{12}$ are each independently hydrogen or an alkyl group having 1 to 6 carbon atoms, $L_1$ is any one selected from a single bond, —O—, —CO—, —COO—, —S—, —SO—, —SO$_2$—, —CR$_{13}$R$_{14}$—, —(CH$_2$)$_Z$—, —O(CH$_2$)$_Z$O—, —COO(CH$_2$)$_Z$OCO—, —CONH—, or phenylene, $R_{13}$ and $R_{14}$ in the $L_1$ are each independently hydrogen, an alkyl group having 1 to 10 carbon atoms or a haloalkyl group having 1 to 10 carbon atoms, Z in the $L_1$ is an integer of 1 to 10, $Y_1$ to $Y_3$ are each independently a divalent organic group represented by Chemical Formula 8,

[Chemical Formula 8]

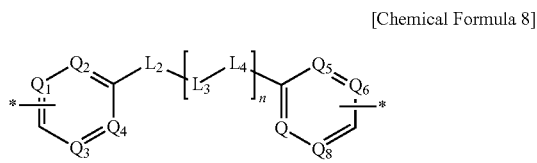

in the Chemical Formula 8,
at least one of $Q_1$ to $Q_8$ is nitrogen and the others are carbon,
at least one of $L_2$ and $L_4$ is one of —CON($R_{15}$)—, —N($R_{16}$)CO— and the other is a direct bond,
$L_3$ is a direct bond or a divalent functional group,
$R_{15}$ to $R_{16}$ are each independently an alkyl group having 1 to 20 carbon atoms or hydrogen,
n is an integer of at least 1,
$Y_4$ to $Y_6$ are each independently a divalent organic group different from the divalent organic group represented by the Chemical Formula 8,

[Chemical Formula 11]

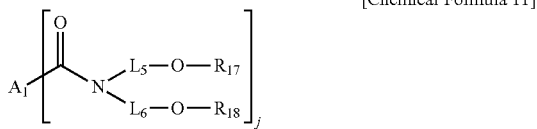

in the Chemical Formula 11,
$A_1$ is a monovalent to a tetravalent functional group,
j is an integer of 1 to 4,
$L_5$ and $L_6$ are same or different from each other, and each independently, an alkylene group having 1 to 10 carbon atoms or an arylene group having 6 to 20 carbon atoms, and
$R_{17}$ and $R_{18}$ are each independently a silicon-containing monovalent functional group.

2. The liquid crystal alignment agent composition of claim 1, wherein in the Chemical Formulae 4 to 6,
$Y_4$ to $Y_6$ includes an aromatic divalent organic group including an arylene group having 6 to 30 carbon atoms; or an imide-based aromatic divalent organic group including an arylene group having 6 to 30 carbon atoms and an imide group.

3. The liquid crystal alignment agent composition of claim 2, wherein
the imide-based aromatic divalent organic group is a divalent organic group represented by Chemical Formula 9:

[Chemical Formula 9]

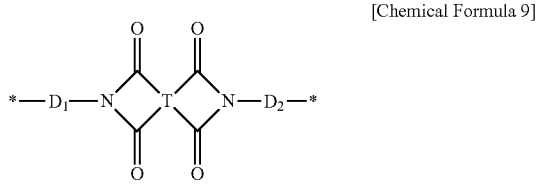

in the Chemical Formula 9,
T is a tetravalent organic group represented by any one of the Chemical Formula 7, and
$D_1$ and $D_2$ are each independently any one selected from an alkylene group having 1 to 20 carbon atoms, a heteroalkylene group having 1 to 10 carbon atoms, a cycloalkylene group having 3 to 20 carbon atoms, an arylene group having 6 to 20 carbon atoms or a heteroarylene group having 2 to 20 carbon atoms.

4. The liquid crystal alignment agent composition of claim 2, wherein
the aromatic divalent organic group is a divalent organic group represented by Chemical Formula 10:

[Chemical Formula 10]

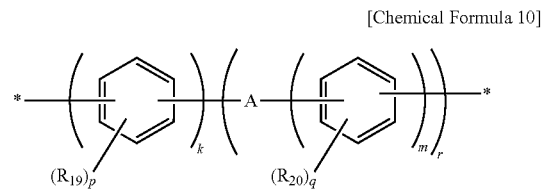

in the Chemical Formula 10,
$R_{19}$ and $R_{20}$ are each independently hydrogen, halogen, cyano, nitrile, an alkyl having 1 to 10 carbon atoms, an alkenyl having 2 to 10 carbon atoms, an alkoxy having 1 to 10 carbon atoms, a fluoroalkyl having 1 to 10 carbon atoms, or a fluoroalkoxy having 1 to 10 carbon atoms,
p and q are each independently an integer of 0 to 4,
A is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—,
y is an integer of 1 to 10,
k and m are each independently an integer of 0 to 3, and
r is an integer of 0 to 3.

5. The liquid crystal alignment agent composition of claim 1, wherein
in the Chemical Formula 8,
$L_3$ is at least one selected from the group of a direct bond, —O—, —S—, —N($R_{21}$)—, —COO—, —CO($R_{22}$)—, —$R_{23}$O—, —C(CF$_3$)$_2$—, —O($R_{24}$)O—, an alkylene group having 1 to 20 carbon atoms, a haloalkylene group having 1 to 20 carbon atoms, a cycloalkylene group having 1 to 20 carbon atoms, or an arylene group having 1 to 30 carbon atoms,
$R_{21}$ is an alkyl group having 1 to 20 carbon atoms or hydrogen, and
$R_{22}$ to $R_{24}$ are each independently at least one selected from the group of a direct bond, an alkylene group having 1 to 20 carbon atoms, or a haloalkylene group having 1 to 20 carbon atoms.

6. The liquid crystal alignment agent composition of claim 1, wherein
in the Chemical Formula 8,
at least one of $Q_2$ and $Q_4$ is nitrogen, the other is carbon, and
$Q_1$ and $Q_3$ are carbon.

7. The liquid crystal alignment agent composition of claim 1, wherein
in the Chemical Formula 8,
at least one of $Q_5$ and $Q_7$ is nitrogen, the other is carbon, and $Q_6$ and $Q_8$ are carbon.

8. The liquid crystal alignment agent composition of claim 1, wherein
the divalent organic group represented by the Chemical Formula 8 includes one of the functional groups represented by Chemical Formula 8-1 to Chemical Formula 8-2:

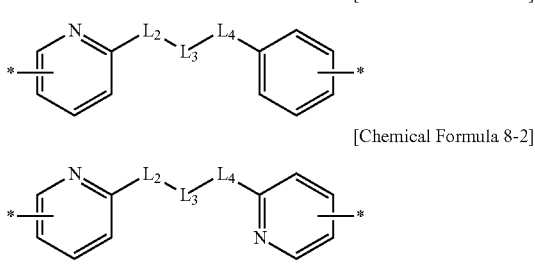

[Chemical Formula 8-1]

[Chemical Formula 8-2]

in the Chemical Formula 8-1 to Chemical Formula 8-2, $L_2$ to $L_4$ are as defined in claim 1.

9. The liquid crystal alignment agent composition of claim 3, wherein
in the Chemical Formula 9, T is a functional group represented by Chemical Formula 7-1 or a functional group represented by Chemical Formula 7-2:

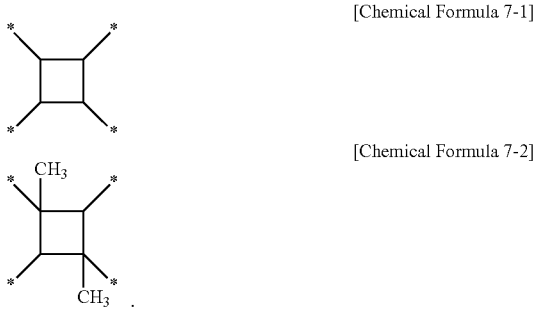

[Chemical Formula 7-1]

[Chemical Formula 7-2]

10. The liquid crystal alignment agent composition of claim 1, wherein
a molar ratio between the first repeating unit and the second repeating unit contained in the copolymer for liquid crystal alignment agent is 1:99 to 99:1.

11. The liquid crystal alignment agent composition of claim 1, wherein
the first repeating unit includes a combination of a diamine containing a heteroaromatic ring and a tetracarboxylic dianhydride.

12. The liquid crystal alignment agent composition of claim 1, wherein
the second repeating unit includes a combination of a diamine containing an aromatic ring, and a tetracarboxylic anhydride.

13. The liquid crystal alignment agent composition of claim 1, wherein
in the Chemical Formula 11,
$A_1$ is an alkylene group having 1 to 10 carbon atoms,
j is 2,
$L_5$ and $L_6$ are each independently an alkylene group having 1 to 5 carbon atoms, and
$R_{17}$ and $R_{18}$ are each independently a silicon-containing monovalent functional group.

14. The liquid crystal alignment agent composition of claim 1, wherein
the silicon-containing monovalent functional group in the Chemical Formula 11 is a functional group represented by Chemical Formula 12:

[Chemical Formula 12]

in the Chemical Formula 12, $R_{25}$, $R_{26}$ and $R_{27}$ are each independently hydrogen or an alkyl having 1 to 10 carbon atoms.

15. A method for preparing a liquid crystal alignment film comprising the steps of:
coating the liquid crystal alignment agent composition of claim 1 onto a substrate to form a coating film;
drying the coating film;
irradiating the coating film with light or subjecting the coating film to rubbing treatment to perform alignment treatment; and
heat-treating and curing the alignment-treated coating film.

16. The method for preparing a liquid crystal alignment film of claim 15, wherein
in the step of heat-treating and curing the alignment-treated coating film, the alignment-treated coating film includes a crosslinker compound represented by Chemical Formula 13:

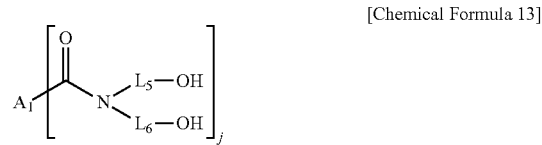

[Chemical Formula 13]

in the Chemical Formula 13,
$A_1$, j, $L_5$ and $L_6$ are as defined in claim 1.

17. A liquid crystal alignment film comprising an aligned cured product of the liquid crystal aligning agent composition of claim 1.

18. A liquid crystal display device comprising the liquid crystal alignment film of claim 17.

* * * * *